United States Patent
Rahimi

(10) Patent No.: US 12,013,281 B2
(45) Date of Patent: Jun. 18, 2024

(54) DEADWEIGHT LOADING APPARATUS, SYSTEM, AND METHOD FOR CALIBRATING A TESTING DEVICE

(71) Applicant: The Boeing Company, Chicago, IL (US)

(72) Inventor: Sobhan M. Rahimi, Huntsville, AL (US)

(73) Assignee: The Boeing Company, Arlington, VA (US)

(*) Notice: Subject to any disclaimer, the term of this patent is extended or adjusted under 35 U.S.C. 154(b) by 413 days.

(21) Appl. No.: 17/553,711

(22) Filed: Dec. 16, 2021

(65) Prior Publication Data
US 2022/0283018 A1 Sep. 8, 2022

Related U.S. Application Data

(60) Provisional application No. 63/157,296, filed on Mar. 5, 2021.

(51) Int. Cl.
*G01G 23/01* (2006.01)
*B62B 3/06* (2006.01)

(52) U.S. Cl.
CPC .............. *G01G 23/01* (2013.01); *B62B 3/06* (2013.01); *B62B 2203/10* (2013.01)

(58) Field of Classification Search
CPC . G01G 1/26; G01G 23/01; B62B 3/06; B62B 2203/10
See application file for complete search history.

(56) References Cited

U.S. PATENT DOCUMENTS

| 5,678,976 | A | * | 10/1997 | Rodriguez | B62B 1/264 414/448 |
| 6,009,740 | A | * | 1/2000 | Devendorf | G01L 25/006 73/1.13 |
| 6,966,739 | B2 | * | 11/2005 | Figiel | B66C 1/485 294/67.1 |
| 7,572,638 | B2 | * | 8/2009 | Pressman | B01D 63/08 436/178 |

(Continued)

FOREIGN PATENT DOCUMENTS

| CN | 112197848 A | * | 1/2021 | ............. G01G 23/01 |
| JP | H09113396 A | * | 5/1997 | |
| WO | WO-2020037559 A1 | * | 2/2020 | |

*Primary Examiner* — Octavia Davis Hollington
(74) *Attorney, Agent, or Firm* — Kunzler Bean & Adamson

(57) ABSTRACT

Disclosed herein is a deadweight loading apparatus, system, and method for calibrating a testing device. The deadweight loading apparatus comprises a cart, comprising a horizontal support surface, a cart handle, a plurality of weights stackable on the horizontal support surface, and a basket supportable on the horizontal support surface. The basket comprising a first side plate and a second side plate. The apparatus also comprises a selector bar comprising two extension arms that are selectively, adjustably, engageable with the first side plate and the second side plate at each one of multiple vertical locations along the first side plate and the second side plate. When the selector bar is selectively, adjustably, engaged with the first side plate and the second side plate, each one of the two extension arms is fitted within a corresponding one of the two grooves on a corresponding weight.

20 Claims, 13 Drawing Sheets

(56) References Cited

U.S. PATENT DOCUMENTS

| | | | | |
|---|---|---|---|---|
| 8,573,609 | B1* | 11/2013 | Moser | B62B 1/14 |
| | | | | 280/47.23 |
| 10,457,184 | B2* | 10/2019 | Hall, Jr. | B66F 7/0683 |
| 10,525,997 | B1* | 1/2020 | Su | B62B 1/142 |
| 10,604,168 | B2* | 3/2020 | Torrison | B66F 9/18 |
| 2004/0256818 | A1* | 12/2004 | Amsili | B62B 1/125 |
| | | | | 280/47.29 |
| 2006/0219836 | A1* | 10/2006 | Shetler | B21D 5/08 |
| | | | | 242/588 |

* cited by examiner

DEADWEIGHT LOADING APPARATUS, SYSTEM, AND METHOD FOR CALIBRATING A TESTING DEVICE

FIELD

This disclosure relates generally to a deadweight loading apparatus, and more particularly to a deadweight loading apparatus for calibrating a testing device.

BACKGROUND

Calibration of testing equipment, such as a torque transducer, helps measuring instruments perform according to expected specifications and standards. Calibration promotes the quality and reliability of the testing equipment used, which in turn, helps to ensure products and processes using the testing equipment meet international and regional regulations.

Current processes for calibrating testing equipment often involve the time-consuming and physically demanding task of manually lifting and/or moving numerous heavy weights onto a cart used for calibration. The operator's movements may involve repeated lifting, twisting, and turning motions to stack the heavy weights onto the cart. Such motions are not only physically demanding and time intensive but may also pose a significant risk of injury to the operator. Furthermore, the operator may be working in confined spaces where assistance from other operators may be restricted due to spatial constraints. Additionally, the calibration process is often repeated multiple times during a calibration session in order to calibrate multiple locations along the testing device and/or to verify and re-calibrate, after adjustment to the testing device, if the testing device is found to be out-of-tolerance. Each repeated calibration process increases the injury risk, time and labor involved in the calibration session.

SUMMARY

The subject matter of the present application provides examples of a deadweight loading apparatus, system, and method that overcome the above-discussed shortcomings of prior art techniques. The subject matter of the present application has been developed in response to the present state of the art, and in particular, in response to shortcomings of conventional deadweight loading processes.

Disclosed herein is a deadweight loading apparatus for calibrating a testing device. The deadweight loading apparatus comprises a cart comprising a horizontal support surface and a cart handle. The deadweight loading apparatus also comprises a plurality of weights stackable on the horizontal support surface. Each weight of the plurality of weights comprises two grooves each located on a corresponding one of opposite sides of the weight. The deadweight loading apparatus further comprises a basket supportable on the horizontal support surface. The basket comprises a first side plate and a second side plate, spaced apart from the first side plate, such that the plurality of weights is positioned between the first side plate and the second side plate when the plurality of weights is stacked on the horizontal support surface and when the basket is supported on the horizontal support surface. Additionally, the deadweight loading apparatus comprises a selector bar. The selector bar comprises two extension arms that are selectively, adjustably, engageable with the first side plate and the second side plate at each one of multiple vertical locations along the first side plate and the second side plate. When the selector bar is selectively, adjustably, engaged with the first side plate and the second side plate, at any one of the multiple vertical locations, each one of the two extension arms is fitted within a corresponding one of the two grooves of a corresponding one of the plurality of weights. The preceding subject matter of this paragraph characterizes example 1 of the present disclosure.

The deadweight loading apparatus further comprises a plurality of restraint arms coupled with the cart. Each restraint arm of the plurality of restraint arms comprises a first end, pivotably attached to the cart handle above the first side plate and the second side plate, and a second end, spaced apart from the first end. Each restraint arm is movable between a stored position, disengaged with the basket, and a restraint position, engaged with the basket. The preceding subject matter of this paragraph characterizes example 2 of the present disclosure, wherein example 2 also includes the subject matter according to example 1, above.

The deadweight loading apparatus further comprises a pin configured to engage with the plurality of restraint arms, when in the restraint position, such that the plurality of restraint arms is retained in the restraint position. The preceding subject matter of this paragraph characterizes example 3 of the present disclosure, wherein example 3 also includes the subject matter according to example 2, above.

The first side plate and the second side plate of the basket are connected by a top plate such that the plurality of weights is positioned below the top plate when the plurality of weights is stacked on the horizontal support surface and when the basket is supported on the horizontal support surface. The preceding subject matter of this paragraph characterizes example 4 of the present disclosure, wherein example 4 also includes the subject matter according to any of examples 1-3, above.

The deadweight loading apparatus further comprises an adapter removably attached to the basket. The adapter comprises a slot configured to removably secure an attachment member of the testing device. The preceding subject matter of this paragraph characterizes example 5 of the present disclosure, wherein example 5 also includes the subject matter according to any one of examples 1-4, above.

The deadweight loading apparatus further comprises a plurality of legs extending from each one of a bottom end of the first side plate and a bottom end of the second side plate. The plurality of legs are spaced apart from each other by a least a width (W) of the horizontal support surface such that the plurality of legs extend downwardly beyond the horizontal support surface when the basket is supported on the horizontal support surface. The preceding subject matter of this paragraph characterizes example 6 of the present disclosure, wherein example 6 also includes the subject matter according to any one of examples 1-5, above.

The horizontal support surface is movable, relative to the cart, to lower or raise the plurality of legs, relative to the cart. The preceding subject matter of this paragraph characterizes example 7 of the present disclosure, wherein example 7 also includes the subject matter according to example 6, above.

Each weight of the plurality of weights comprises a through-slot that extends from an outer periphery of the weight, on one side of the weight, to a location intermediate the one side of the weight and another side of the weight, opposite the one side of the weight. The basket comprises a center panel, extending perpendicularly from the first side plate toward the second side plate and terminating at a location intermediate the first side plate and the second side plate. When the plurality of weights is stacked on the horizontal support surface and when the basket is supported on the horizontal support surface, the center panel fits within the through-slot of each weight of the plurality of weights. The preceding subject matter of this paragraph characterizes example 8 of the present disclosure, wherein example 8 also includes the subject matter according to any one of examples 1-7, above.

The deadweight loading apparatus further comprises a lifting system coupled with the cart and the horizontal support surface. The lifting system is operational to alternatively raise and lower the horizontal support surface relative to the cart. The preceding subject matter of this paragraph characterizes example 9 of the present disclosure, wherein example 9 also includes the subject matter according to any one of examples 1-8, above.

The lifting system comprises a user control device and at least one actuator. The user control device is fixed to the cart and is operationally coupled with the at least one actuator and operational to actuate the at least one actuator. The at least one actuator comprises a first end portion fixed to the cart and a second end portion fixed to the horizontal support surface. Actuation of the at least one actuator comprises movement of the second end portion relative to the first end portion. The preceding subject matter of this paragraph characterizes example 10 of the present disclosure, wherein example 10 also includes the subject matter according to example 9, above.

The user control device comprises one of a manually-operable hand crank or an automated controller. The preceding subject matter of this paragraph characterizes example 11 of the present disclosure, wherein example 11 also includes the subject matter according to example 10, above.

Alternatively, the deadweight loading apparatus further comprises a lifting system that is separable from and engageable with the horizontal support surface. The lifting system comprises a lift cart that is movable into a position under the horizontal support surface and operational to alternatively raise and lower the horizontal support surface relative to the cart. The preceding subject matter of this paragraph characterizes example 12 of the present disclosure, wherein example 12 also includes the subject matter according to any of examples 1-8, above.

Further disclosed herein is a deadweight loading system for calibrating a testing device. The deadweight loading system comprises a cart comprising a horizontal support surface and a cart handle. The deadweight loading system also comprises a plurality of weights stackable on the horizontal support surface, each weight of the plurality of weights comprises two grooves each located on a corresponding one of opposite sides of the weight. The deadweight loading system further comprises a basket supportable on the horizontal support surface. The basket comprises a first side plate and a second side plate, connected by a top plate. The first side plate is spaced apart from the second side plate such that the plurality of weights is positioned between the first side plate and the second side plate and below the top plate when the plurality of weights is stacked on the horizontal support surface and when the basket is supported on the horizontal support surface. Additionally, the deadweight loading system comprises a selector bar comprising two extension arms that are selectively, adjustably, engageable with the first side plate and the second side plate at each one of multiple vertical locations along the first side plate and the second side plate. When the selector bar is selectively, adjustably, engaged with the first side plate and the second side plate at any one of the multiple vertical locations each one of the two extension arms is fitted within a corresponding one of the two grooves of a corresponding one of the plurality of weights. The deadweight loading system also comprises a lifting system coupled with the cart and the horizontal support surface. The lifting system is operational to alternatively raise and lower the horizontal support surface relative to the cart. The deadweight loading system further comprises an adapter removably attached to the top plate of the basket. The adapter comprising a slot configured to removably secure an attachment member of the testing device when the lifting system is operated to raise the horizontal support surface relative to the cart and the attachment member is secured within the slot of the adapter. The preceding subject matter of this paragraph characterizes example 13 of the present disclosure.

The lifting system comprises a user control device and at least one actuator. The user control device is fixed to the cart and is operationally coupled with the at least one actuator and operational to actuate the at least one actuator. The at least one actuator comprises a first end portion fixed to the cart and a second end portion fixed to the horizontal support surface. Actuation of the at least one actuator comprises movement of the second end portion relative to the first end portion. The preceding subject matter of this paragraph characterizes example 14 of the present disclosure, wherein example 14 also includes the subject matter according to example 13, above.

Additionally, disclosed herein is a method of calibrating a testing device using a deadweight loading apparatus. The method comprises moving a cart of the deadweight loading apparatus into a position aligned with a testing device. The method also comprises fitting two extension arms of a selector bar of the deadweight loading apparatus into corresponding grooves of one weight of a plurality of weights stacked on a horizontal support surface of the cart between a first side plate and a second side plate of a basket of the deadweight loading apparatus. The two extension arms of the selector bar are fitted into the corresponding grooves of the one weight of the plurality of weights, supporting the two extension arms of the selector bar on the first side plate and the second side plate such that the one weight of the plurality of weights, and any weights of the plurality of weights stacked on the one weight of the plurality of weights, is supported on the first side plate and the second side plate via the two extension arms of the selector bar. The method further comprises loading the testing device wherein the basket and the one weight of the plurality of weights and any weights of the plurality of weights stacked on the one weight of the plurality of weights are supported by the testing device. Furthermore, any weights of the plurality of weights on which the one weight of the plurality of weights was stacked remains supported on the horizontal support surface. The preceding subject matter of this paragraph characterizes example 15 of the present disclosure.

The step of moving a cart of the deadweight loading apparatus into a position aligned with a testing device comprises moving the cart into a position under an attachment member of the testing device. The step of loading the testing device comprises lifting the horizontal support surface, relative to the cart, such that the horizontal support surface raises the plurality of weights and the basket. The step of loading the testing device also comprises securing the attachment member of the testing device to the basket. Additionally, the step of loading the testing device comprises lowering the horizontal support surface, relative to the cart, such that the one weight of the plurality of weights, and any weights of the plurality of weights stacked on the one weight, is suspended by the attachment member of the testing device. Any weights of the plurality of weights on which the one weight was stacked remains supported on the horizontal support surface. The preceding subject matter of this paragraph characterizes example 16 of the present disclosure, wherein example 16 also includes the subject matter according to example 15, above.

Alternatively, the step of moving a cart of the deadweight loading apparatus into a position aligned with a testing device comprises moving the cart over a scale of the testing device. The step of loading the testing device comprises lowering the horizontal support surface, relative to the cart, such that the horizontal support surface lowers the basket and the plurality of weights until the basket and the one weight of the plurality of weights, and any weights of the plurality of weights stacked on the one weight, is supported only on the scale of the testing device. Any weights of the plurality of weights on which the one weight was stacked remains supported on the horizontal support surface. The preceding subject matter of this paragraph characterizes example 17 of the present disclosure, wherein example 17 also includes the subject matter according to example 15, above.

The method further comprises selecting a desired mass to be loaded on the testing device. The mass of the one weight of the plurality of weights, and any weights of the plurality of weights stacked on the one weight equal to the desired mass. The preceding subject matter of this paragraph characterizes example 18 of the present disclosure, wherein example 18 also includes the subject matter according to any one of examples 15-17, above.

The step of loading the testing device comprises loading comprises engaging a lifting system coupled with the cart and the horizontal support surface. The lifting system operational to alternatively raise and lower the horizontal support surface relative to the cart. The preceding subject matter of this paragraph characterizes example 19 of the present disclosure, wherein example 19 also includes the subject matter according to any one of examples 15-18, above.

The lifting system comprises a user control device and at least one actuator coupled to the user control device. The at least one actuator comprises a first end portion fixed to the cart and a second end portion fixed to the horizontal support surface. Actuating the at least one actuator moves the second end portion relative to the first end portion. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein is a deadweight loading apparatus, system, and method for calibrating a testing device. The deadweight loading apparatus comprises a cart with a horizontal support surface, a plurality of weights stackable on the horizontal support surface, a basket supportable on the horizontal support surface, and a selector bar that is selectively and adjustably engageable with the basket and any weight of the plurality of weights. A lifting system is coupled with the cart and is operational to raise and lower the horizontal support surface, relative to the cart. Accordingly, the lifting system is operational to raise and lower any objects that are supported on the horizontal support surface, including any weights, basket and/or selector bar. Raising and lowering the horizontal support surface, by operating the lifting system, eliminates the need for manually lifting any weights of the plurality of weights by an operator when calibrating a testing device. Using the deadweight loading apparatus to calibrate a testing device helps to reduce injury risk to an operator by reducing (e.g., eliminating) the need for the operator to manually lift and/or move weights, as well as, reduces the overall time and labor involved in the calibrating process.

Figure 1:
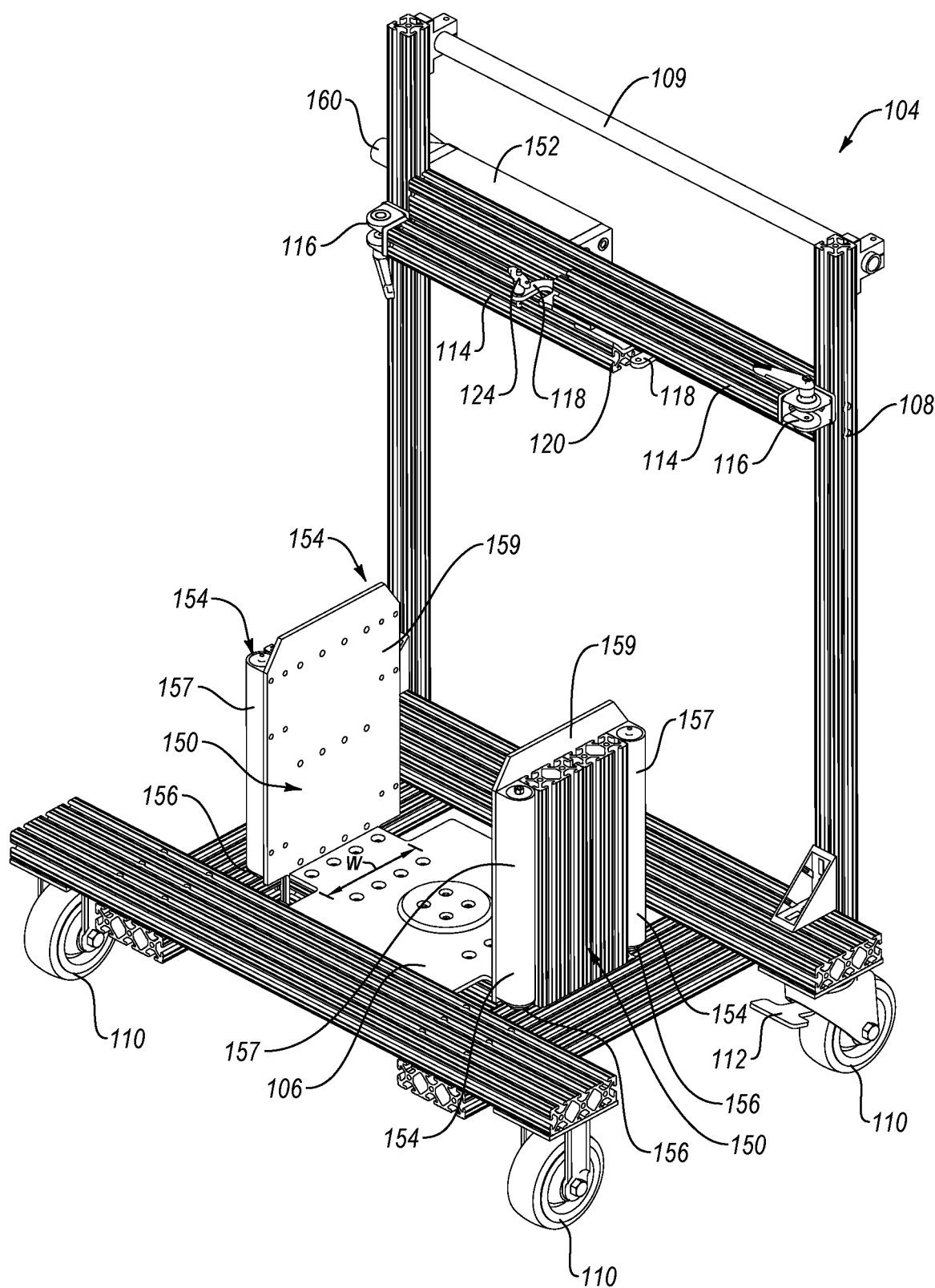
FIG. 1 is a schematic perspective view of a cart of a deadweight loading apparatus, according to one or more examples of the present disclosure.

Referring to FIG. 1, and according to some examples, a cart 104 of a deadweight loading apparatus 100 (see, e.g., FIG. 5) is shown. The cart 104 includes a horizontal support surface 106 that is defined by a horizontal support plate, in some examples, and is configured to support objects on the horizontal support surface 106, such as a plurality of weights and/or a basket. For example, the horizontal support surface 106 may support objects on the horizontal support surface 106 along the width W of the horizontal support surface 106. In some examples, the horizontal support surface 106 defines a smooth and flat surface that is configured to have objects supported on the horizontal support surface 106. In other examples, the horizontal support surface 106 has protrusions or depressions that correspond with depressions or protrusions, respectively, in an object or objects to be supported on the horizontal support surface 106. Engagement between the corresponding protrusions and depressions help to more securely retain the object(s), when supported on the horizontal support surface 106. Accordingly, the horizontal support surface 106 may have at least one protrusion that corresponds with at least one depression in an object, such as, but not limited to, a weight, such that when the object is supported on the horizontal support surface 106, any protrusions on the horizontal support surface 106 are fitted within a corresponding depression in the object and vice versa.

The horizontal support surface 106 is configured to be raised and/or lowered, relative to the cart 104. Accordingly, any objects supported by the horizontal support surface 106 are raised or lowered, relative to the cart 104, as the horizontal support surface 106 is raised or lowered. A lifting system 150 is coupled with the cart 104 and the horizontal support surface 106 and is operable to raise and/or lower the horizontal support surface 106. The lifting system 150 includes a user control device 152, fixed to the cart 104, and at least one actuator 154. As shown, the lifting system 150 includes four actuators 154 that are operationally coupled with the user control device 152. In one example, the actuators 154 are operationally coupled with the user control device by cables or wires (not shown) that extend from the user control device 152 to each of the actuators 154. Each one of the actuators 154 has a first end portion 156, which is fixed to the cart 104, and a second end portion 157, which is fixed to the horizontal support surface 106 via one of two upright containment plates 159. The upright containment plates 159 are fixed to, and extend transversely relative to, the horizontal support surface 106, such as via fasteners or other coupling technique. When the actuators 154 are actuated, the second end portion 157 moves relative to the first end portion 156. In other words, when actuated, the actuators 154 can either raise or lower the horizontal support surface 106 by moving the second end portion 157, fixed to the horizontal support surface 106, relative to the first end portion 156, fixed to the cart 104. The actuators 154 may be mechanical, electrical, hydraulic, pneumatic or other types of actuators.

The cart 104 is movable relative to a surface on which the cart 104 is supported. Accordingly, the cart 104 may be moved to a location for calibration or storage purposes. The cart 104 has movement elements attached to the underside of the cart 104. The movement elements may include as many movement elements attached to the underside of the cart 104 as necessary to move the cart, such as a movement element attached at each corner of the cart 104. The movement elements may be any element that allows the cart 104 to move along a surface, such as wheels, rollers, casters, etc. As shown, the cart 104 has a wheel 110 attached to the underside of the cart 104, at each corner of the cart 104. The wheels 110 allow the cart 104 to move along the surface. In some examples, at least one of the wheels 110 has a wheel lock 112 that can be used to prevent the wheel 110 from rotating and therefore prevent the cart 104 from moving along the surface, when the wheel 110 is locked.

The cart 104 also includes a user engagement portion 108. The user engagement portion 108 may be utilized, to assist an operator using the cart 104, to move the cart 104 around the surface on which the cart 104 is supported. In some examples, the user engagement portion 108 extends perpendicularly upward from the horizontal support surface 106. In other examples, the user engagement portion 108 extends upwardly at an angle from the horizontal support surface 106. The user engagement portion 108 may have a handle 109, such as a bar, that allows an operator to grip onto the handle 109 to assist in moving the cart 104 on the surface. In some examples, the handle 109 is at a height, relative to the surface on which that cart 104 is supported, that an operator supported on the same surface can comfortably move the cart 104 while gripping the handle 109. In some examples, the user engagement portion 108 may be adjustable in length and/or angle from the horizontal support surface 106, which may be useful for operators having different heights and/or for storage purposes.

The user control device 152 of the lifting system 150 is fixed to the cart 104. In one example, the user control device 152 is fixed on the user engagement portion 108. The user control device 152 may be at a height, relative to the surface that the cart 104 and the operator are supported, in which an operator can comfortably control the user control device 152. The user control device 152 may include a manually-operated hand crank 160 or an automated controller. In another examples, the user control device 152 is fixed to the cart 104 but not on the user engagement portion 108.

A plurality of restraint arms 114 is coupled to the cart 104, at the user engagement portion 108. Each restraint arm of the plurality of restraint arms 114 includes a first end 116 that is pivotably attached to the user engagement portion 108. A second end 118 is spaced apart from the first end 116 of the restraint arm. Each restraint arm is movable between a stored position 120, as shown, where each restraint arm is disengaged from any objects supported on the horizontal support surface 106, and a restraint position, where each restraint arm 114 is engaged with an object(s) supported on the horizontal support surface 106. In one example, the plurality of restraint arms 114 are attached to the user engagement portion 108 at any location along the length of the user engagement portion 108 and are configured to engage with an object supported on the horizontal support surface 106. In other examples, the plurality of restraint arms 114 are attached to the user engagement portion 108 at a location that is near the top of any objects that are to be stacked on the horizontal support surface 106 and are configured to engage with the object. For example, when a basket is supported on the horizontal support surface 106, the plurality of restraint arms 114 are attached to the user engagement portion 108 at a location adjacent to a top plate of the basket (see, e.g., FIG. 5). A pin 124 is attachable to one of more of the plurality of restraint arms 114. The pin 124 is configured to engage with the plurality of restraint arms 114 when the plurality of restraint arms are in the restraint position. Accordingly, the pin 124 is configured to retain the plurality of restraint arms 114 in the restraint position.

The user engagement portion 108 may be constructed from the same material as the cart 104. In some examples, the cart 104 is constructed out of a plurality of 80-20 structural beams that can be sized for multiple deadweight loading applications. The horizontal support surface 106 can be constructed from any material with the structural strength to support and lift any objects placed on the horizontal support surface without deformation, such as metal, plastic, composite, wood, etc.

Figure 2:
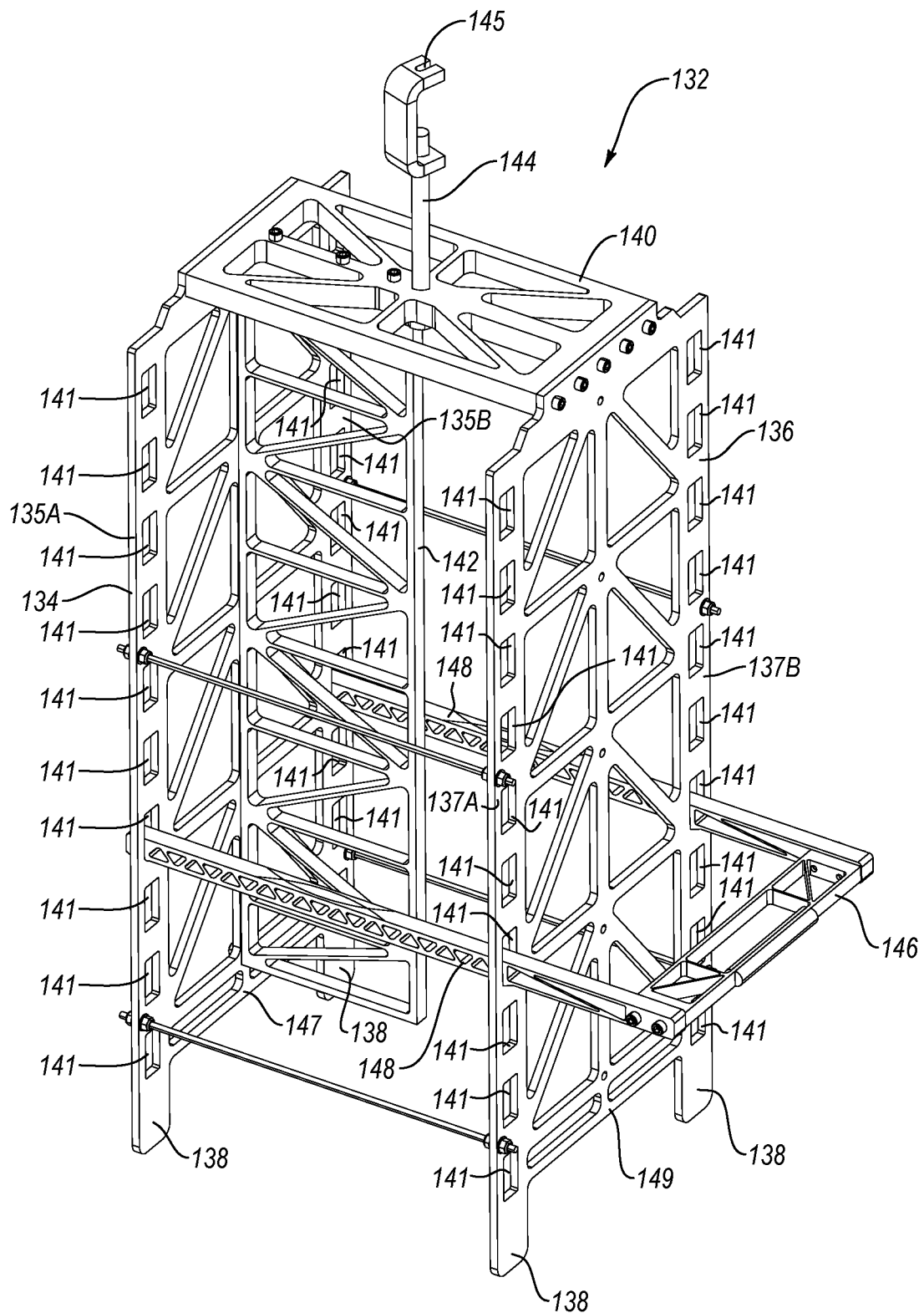
FIG. 2 is a schematic perspective view a basket of a deadweight loading apparatus, according to one or more examples of the present disclosure.

Referring to FIG. 2, according to some examples, a basket 132 of a deadweight loading apparatus 100 is shown. The basket 132 is configured to be supportable on a horizontal support surface 106 of the cart 104 (see, e.g., FIG. 5). The basket includes a first side plate 134 and a second side plate 136 that is spaced apart from the first side plate 134. In one example, the first side plate 134 and the second side plate 136 are spaced apart from each other such that an object, that is configured to be supportable on the horizontal support surface, can be positioned between the first side plate 134 and the second side plate 136. Accordingly, when the object is supported on the horizontal support surface 106, the first side plate 134 is configured to be adjacent one side of the supportable object and the second side plate 136 to be adjacent another side of the supportable object, that is opposite the one side of the supportable object. In another example, the first side plate 134 is spaced apart from the second side plate 136 such that a plurality of weights can be positioned between the first side plate 134 and the second side plate 136.

The first side plate 134 and the second side plate 136 of the basket 132 are connected by a top plate 140. One side of the top plate 140 is attached to the top end of the first side plate 134 and another side of the top plate 140, that is opposite the one side of the top plate 140, is attached to the top end of the second side plate 136. Accordingly, the first side plate 134 and the second side plate 136 face each other, with the top plate 140 attached to both of the side plates at the top ends of the side plates. The top plate 140 is configured to be positioned above any objects supported on the horizontal support surface 106, when the objects and the basket 132 are both supported by the horizontal support surface 106. For example, if the object supported on the horizontal support surface 106 is a plurality of weights, the plurality of weights would be positioned below the top plate 140 when the plurality of weights is stacked on the horizontal support surface 106 and when the basket 132 is supported on the horizontal support surface 106.

An adapter 144 is removably attached to the basket 132. The adapter includes a slot 145 that is configured to removably secure a testing device (see, e.g., FIG. 9). The adapter 144 is removably attached to the top plate 140 of the basket 132. The adapter 144 may be attached to the top plate 140 at a single threaded hole in the center of the top plate 140, such that when the basket 132 is suspended by the adapter 144, the weight of the basket 132 is evenly suspended from the adapter 144. Various designs of adapters 144 can be removably attached to the basket 132 and may depend on the size and/or shape of an attachment member of a testing device.

A plurality of legs 138 extend from a bottom end 147 of the first side plate 134 and a bottom end 149 of the second side plate 136. In one example, the first side plate 134 and the second side plate 136 each have two legs 138, one at each edge of the side plate, that extend from the bottom end 147 and the bottom end 149. When the basket 132 is supported on a horizontal support surface 106, the plurality of legs 138 are spaced apart from each other by at least a width W of the horizontal support surface 106 such that the plurality of legs 138 extend downwardly beyond (e.g., straddle) the horizontal support surface 106 when the basket 132 is supported on the horizontal support surface 106 (see, e.g., FIG. 5). In another example, the first side plate 134 and the second side plate 136 each have more than two legs 138 that extend from the bottom end 147 and the bottom end 149. The number of legs may depend on the size and weight of the basket 132. The plurality of legs 138 may be configured to extend beyond a horizontal support surface 106 of a cart 104, when the basket 132 is supported by the horizontal support surface 106.

The basket 132 also includes a center panel 142 that extends perpendicularly from the first side plate 134 toward the second side plate 136 and terminates at a location intermediate the first side plate 134 and the second side plate 136. In other words, the center panel 142 extends only a portion of the distance between the first side plate 134 and the second side plate 136. In one example, the center panel 142 terminates at a center point between the first side plate 134 and the second side plate 136. In another example, the center panel 142 terminates at a location that is less than the center point between the first side plate 134 and the second side plate 136. The center panel 142 extends along the length of the first side 134, from the bottom end 147 to a location adjacent to the top plate 140.

The first side plate 134 includes a plurality of selector-bar engagement openings 141 that are spaced-part along a height of a first edge 135A and a second edge 135B of the first side plate 134. A height of each one of the selector-bar engagement openings 141 along the first edge 135A corresponds with the same height of a corresponding one of the selector-bar engagement openings 141 along the second edge 135B, such that each one of the selector-bar engagement openings 141 formed in the first edge 135A is horizontally aligned with a corresponding one of the selector-bar engagement openings 141 formed in the second edge 135B. Additionally, the second side plate 136 also includes a plurality of selector-bar engagement openings 141 that are spaced-apart along a height of a first edge 137A and a second edge 137B of the second side plate 136. Likewise, a height of each one of the selector-bar engagement openings 141 along the first edge 137A corresponds with the same height of a corresponding one of the selector-bar engagement openings 141 along the second edge 137B, such that each one of the selector-bar engagement openings 141 formed in the first edge 137A is horizontally aligned with a corresponding one of the selector-bar engagement openings 141 formed in the second edge 137B. Additionally, in some examples, a height of each one selector-bar engagement opening 141 in the first side plate 134 corresponds with the same height of a corresponding one of the selector-bar engagement openings 141 along the second side plate 136. Accordingly, in some examples, one selector-bar engagement opening in each of the first edge 135A, the second edge 135B, the first edge 137A, and the second edge 137B corresponds with each other, such that the selector-bar engagement openings 141 at a particular height or vertical location are in horizontally alignment with each other.

A selector bar 146, which includes two extension arms 148, is engaged with the basket 132. In one example, the extension arms 148 are selectively and adjustably engageable with the first side plate 134 or the second side plate 136 via engagement with the selector-bar engagement openings 141 corresponding with a particular height. In other words, when the selector bar 146 is engaged with the basket 132, the extension arms 148 only engage with selector-bar engagement openings 141 in one of the side plates. In other examples, the extensions arms 148 are selectively and adjustably engageable with the first side plate 134 and the second side plate 136 of the basket 132 at corresponding selector-bar engagement openings 141 along the first side plate 134 and the second side plate 136. Accordingly, when the selector bar 146 is engaged with the basket 132, the extension arms 148 engage with selector-bar engagement openings 141 in both of the first side plate 134 and the second side plate 136. When engaged with the first side plate 134, the extension arms 148 are configured to be engaged with one selector-bar engagement opening 141 corresponding with a particular height in the first edge 135A and one selector-bar engagement opening 141 corresponding with the same height in the second edge 135B. Likewise, when engaged with the second side plate 136, the extension arms 148 are configured to be engaged with one selector-bar engagement opening 141 corresponding with a particular height in the first edge 137A and one selector-bar engagement opening 141 corresponding with the same height in the second edge 137B.

Figure 5:
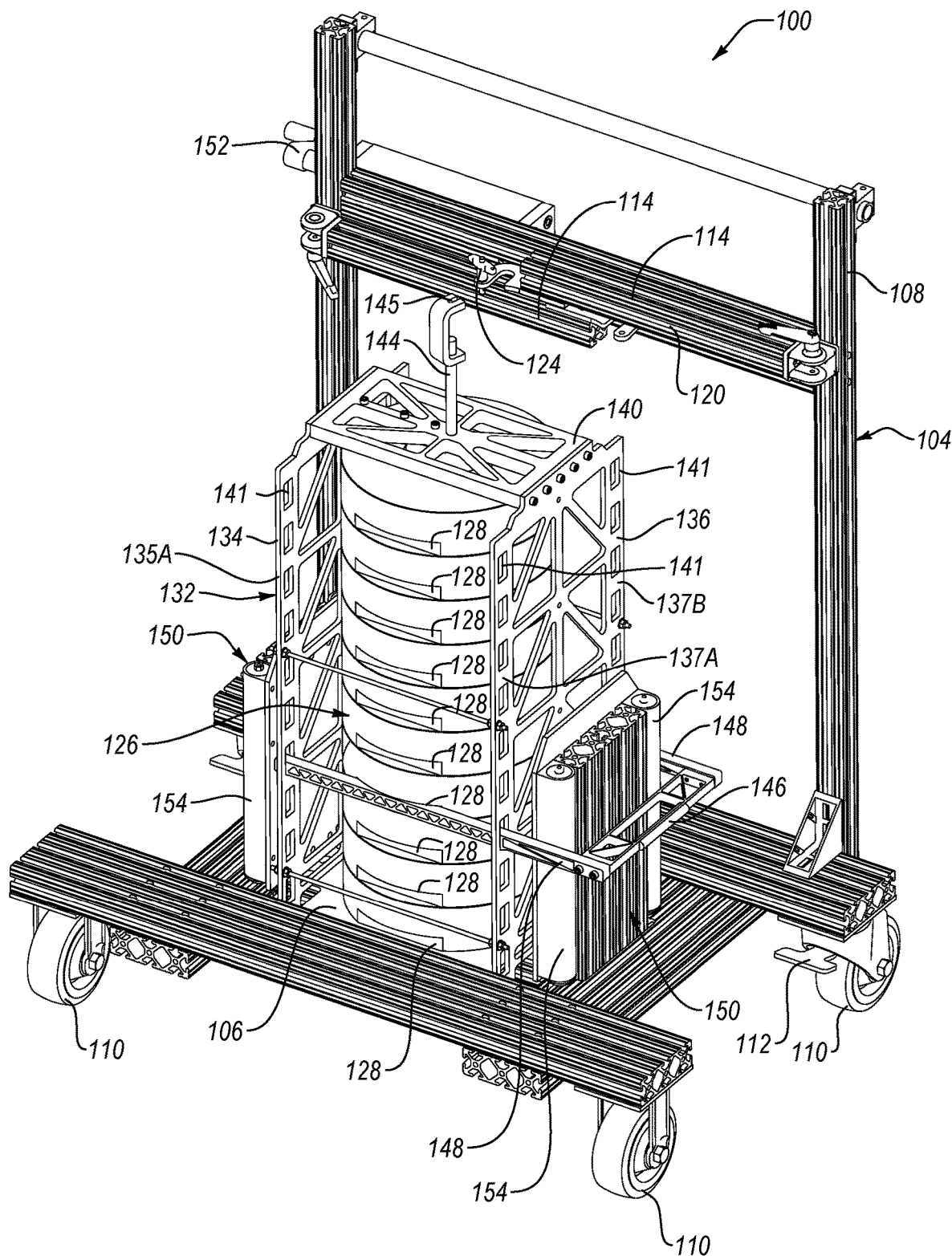
FIG. 5 is a schematic perspective view of a deadweight loading apparatus for calibrating a testing device, where the deadweight loading apparatus has a plurality of weights stacked on a horizontal support surface and a basket supported by the horizontal support surface, according to one or more examples of the present disclosure.

The height of a selector-bar engagement opening 141 is correlated with a thickness of one weight of a plurality of weights 126, such that each height of the selector-bar engagement openings 141 along the first side plate 134 and each height of the selector-bar engagement openings 141 along the second side plate 136 are associated with a corresponding weight of the plurality of weights 126 (see, e.g., FIG. 5). A weight indicia may be engraved, printed, or otherwise indicated on the first side plate 134 and/or the second side plate 136 adjacent to each selector-bar engagement opening 141, such that the weight indicia would indicate to an operator the mass that would be lifted by the selector bar 146 if the selector bar 146 was engaged within a specific selector-bar engagement opening 141. In some examples, each height along the first edge 135A of the first side plate 134 may have a weight indicia indicating the mass of the weight(s) at each selector-bar engagement opening 141. For example, the first selector-bar engagement opening 141 nearest the top of the first side plate 134 has a first height $H_1$, the second selector-bar engagement opening 141 has a height $H_2$, the third selector-bar engagement opening 141 has a height $H_3$, and continues until the last selector-bar engagement opening 141 with a height HL. The first height $H_1$ corresponds with a mass of N lbs, the second height $H_2$ corresponds with a mass of N+1 lbs, the third height $H_3$ corresponds with a mass of N+2 lbs, etc., where N is equal to the mass of a single weight. In one example, if each weight of the plurality of weights 126 has a mass of 50 lbs, $H_1$ would have a weight indicia of 50 lbs, $H_2$ would have a weight indicia of 100 lbs, $H_3$ would have a weight indicia of 150 lbs, etc.

Figure 3:
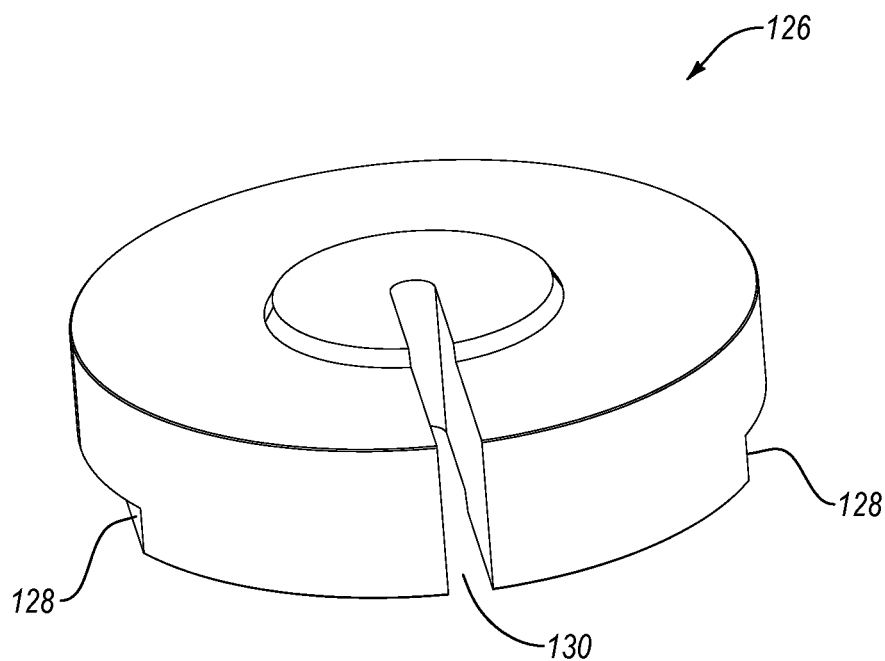
FIG. 3 is a schematic perspective view of a top of a weight of a plurality of weights of a deadweight loading apparatus, according to one or more examples of the present disclosure.
Figure 4:
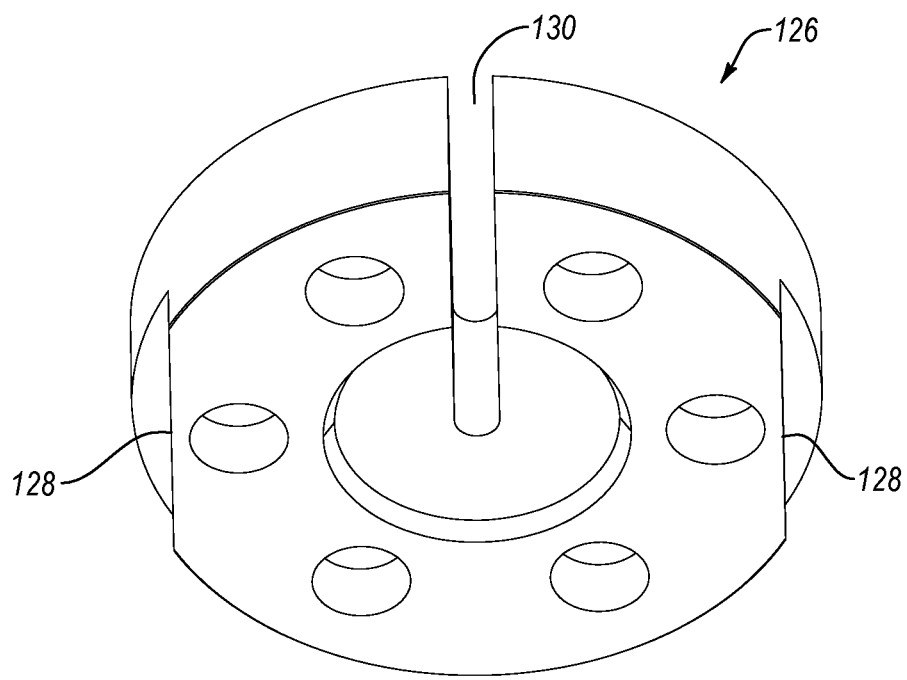
FIG. 4 is a schematic perspective view of a bottom of the weight of the plurality of weights of FIG. 3, according to one or more examples of the present disclosure.

Referring to FIGS. 3 and 4, respectively, a schematic perspective view of a top of a weight 126 and schematic perspective view of a bottom of a weight 126 is shown. The weight 126 is configured to be stackable with other weights 126 on the horizontal support surface 106 of the deadweight loading apparatus 100 (see, e.g., FIG. 5). The weight 126 includes two grooves 128 each located on a corresponding one of opposite sides of the weight 126. In one example, the two grooves 128 are located along the bottom of the weight 126 on opposite sides of the weight 126, as shown. In other examples, the two grooves 128 are at a location intermediate the top and bottom of the weight 126 on opposite sides of the weight 126. Each groove 128 extends from an outer periphery on one side of the weight 126 to an outer periphery on another side of the weight 126, opposite the one side of the weight 126, such that one extension arm 148 of a selector bar 146 can be slid into and extend beyond the groove 128 of the weight 126. The two grooves 128 are sized to fit a corresponding one of the extension arms 148 of the selector bar 146 within the corresponding groove (see, e.g., FIG. 10).

The weight 126 includes a through-slot 130 that extends from an outer periphery of the weight 126, on one side of the weight 126, to a location intermediate the one side of the weight and another side of the weight 126, that is opposite the one side of the weight 126. In other words, the through-slot 130 extends from an outer periphery of the weight 126 towards the opposite side of the weight 126 but does not extend through the entirety of the weight 126. The through-slot 130 is configured to allow the center panel 142 of the basket 132 to fit within the through-slot (see, e.g., FIG. 10). The through-slot is located at a location intermediate the two grooves 128 of the weight 126.

In some examples, the weight 126 has protrusions or depressions that correspond with protrusions or depressions in other weights that are configured to be stackable on the weight 126 and more securely support the weight 126 when stacked with other weights. As shown in FIG. 3, the top of the weight 126 has a protrusion that extends outwardly from the center of the weight 126. The protrusion corresponds in size and depth to a depression in the bottom of the weight 126, as shown in FIG. 4. Accordingly, when one weight 126 is stack upon another weight 126, the protrusion on a top of a first one of weights 126 (i.e., the weight on the bottom of the stack) will fit within the depression on a bottom of a second one of the weights 126 that is stacked above the first one of the weights 126. As more weights are added to the stack of weights 126, the protrusions on the stacked weight 126 on top of the stack will continue to be fitted within the depression of a next one of the weights 126 added to the stack.

The shape and mass of the weight 126 can vary. In one example, the weight 126 has a round shape with the two grooves 128 located along the curved outside edges of the weight 126, as shown in FIG. 3. In this example, the through-slot 130 may correspond to a radius of the weight 126. In other examples, the weight 126 has a shape with straight edges, such as a square or rectangle shape, with the two grooves 128 located along opposite straight edge of the weight. Generally, each weight 126 in a plurality of weights will have the same shape and mass.

Figure 6:
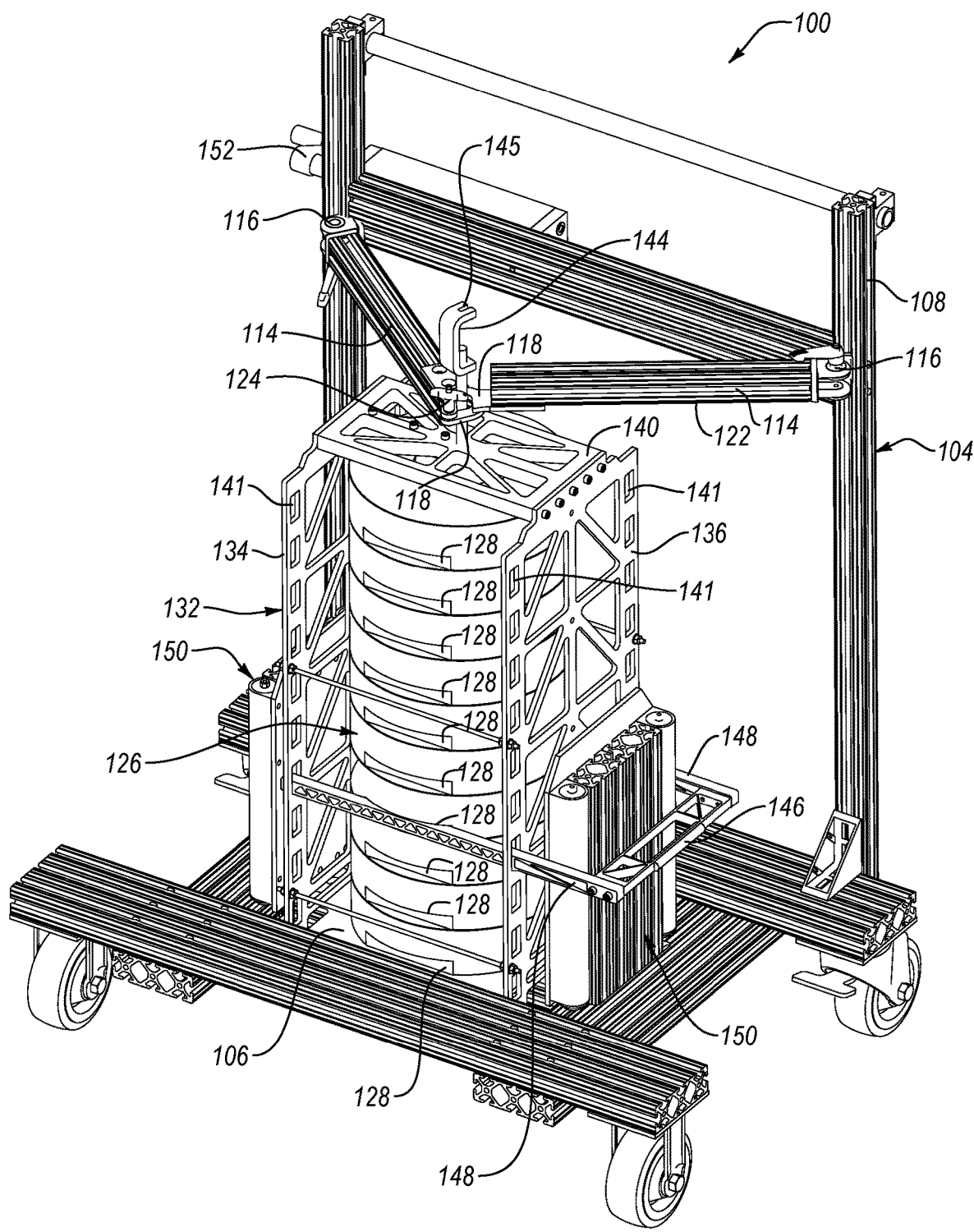
FIG. 6 is a schematic perspective view of the deadweight loading apparatus of FIG. 5, where a plurality of restraint arms of the deadweight loading apparatus are engaged with the basket of the deadweight loading apparatus, according to one or more examples of the present disclosure.

Referring to FIG. 5 and FIG. 6, according to some examples, a deadweight loading apparatus 100 is shown. The deadweight loading apparatus 100 includes a cart, such as the cart 104. As presented above, the cart 104 also includes a plurality of wheels 110 attached to the underside of the cart 104. At least one of the wheels includes a wheel lock 112 used to lock the wheel 110 and prevent the cart 104 from moving around a surface on which the cart 104 is supported. A plurality of weights 126 are stacked on the horizontal support surface 106. A basket 132 is also supported on the horizontal support surface 106 of the cart 104. The first side plate 134 and the second side plate 136 of the basket 132 are spaced apart from each other such that the plurality of weights 126 are positioned between the first side plate 134 and the second side plate 136. The top plate 140 of the basket 132 is attached to the first side plate 134 and the second side plate 136 and above the plurality of weights 126. An adapter 144 is removably attached to the top plate 140.

The first side plate 134 has multiple selector-bar engagement openings 141 along edges 135A and 135B and the second side plate 136 has multiple selector-bar engagement openings 141 in edges 137A and 137B. One groove 128 in each weight of the plurality of weights 126 is aligned with a selector-bar engagement opening 141 in the first side plate 134 and a selector-bar engagement opening 141 in the second side plate 136. Each extension arm 148 of the selector bar 146, is adjustably engaged with the first side plate 134 and the second side plate 136, via the selector-bar engagement openings 141, and a corresponding one of two grooves 128 of a corresponding one of the plurality of weights 126.

The deadweight loading apparatus 100 also includes a lifting system 150 with includes a plurality of actuators 154. The actuators 154 are fixed to the horizontal support surface 106 and, when actuated, can raise and lower the horizontal support surface 106 and therefore the plurality of weights 126 and the basket 132 supported on the horizontal support surface 106.

A plurality of restraint arms 114 are attached to the user engagement portion 108. The plurality of restraint arms 114 are in a stored position 120. While in the stored position 120, the plurality of restraint arms 114 are disengaged from the basket 132. The plurality of restraint arms 114 are movable between the stored position 120 and a restraint position 122, as shown in FIG. 6. A first end 116 of each restraint arm of the plurality of restraint arms 114 is pivotably attached to the user engagement portion 108. In one example, the plurality of restraint arms 114 are pivotably attached to the user engagement portion 108 above the first side plate 134 and the second side plate 136. The plurality of restraint arms 114 are configured to engage with the top plate 140 or the adapter 144 attached to the top plate 140. In other examples, the plurality of restraint arms 114 are pivotably attached to the user engagement portion 108 along the length of the first side plate 134 and the second side plate 136, such that the plurality of restraint arms 114 engage with the basket 132 along the length of the first side plate 134 and the second side plate 136. A pin 124 is engaged with the plurality of restraint arms 114 to retain the plurality of restraint arms 114 in the restraint position 122.

Figure 7:
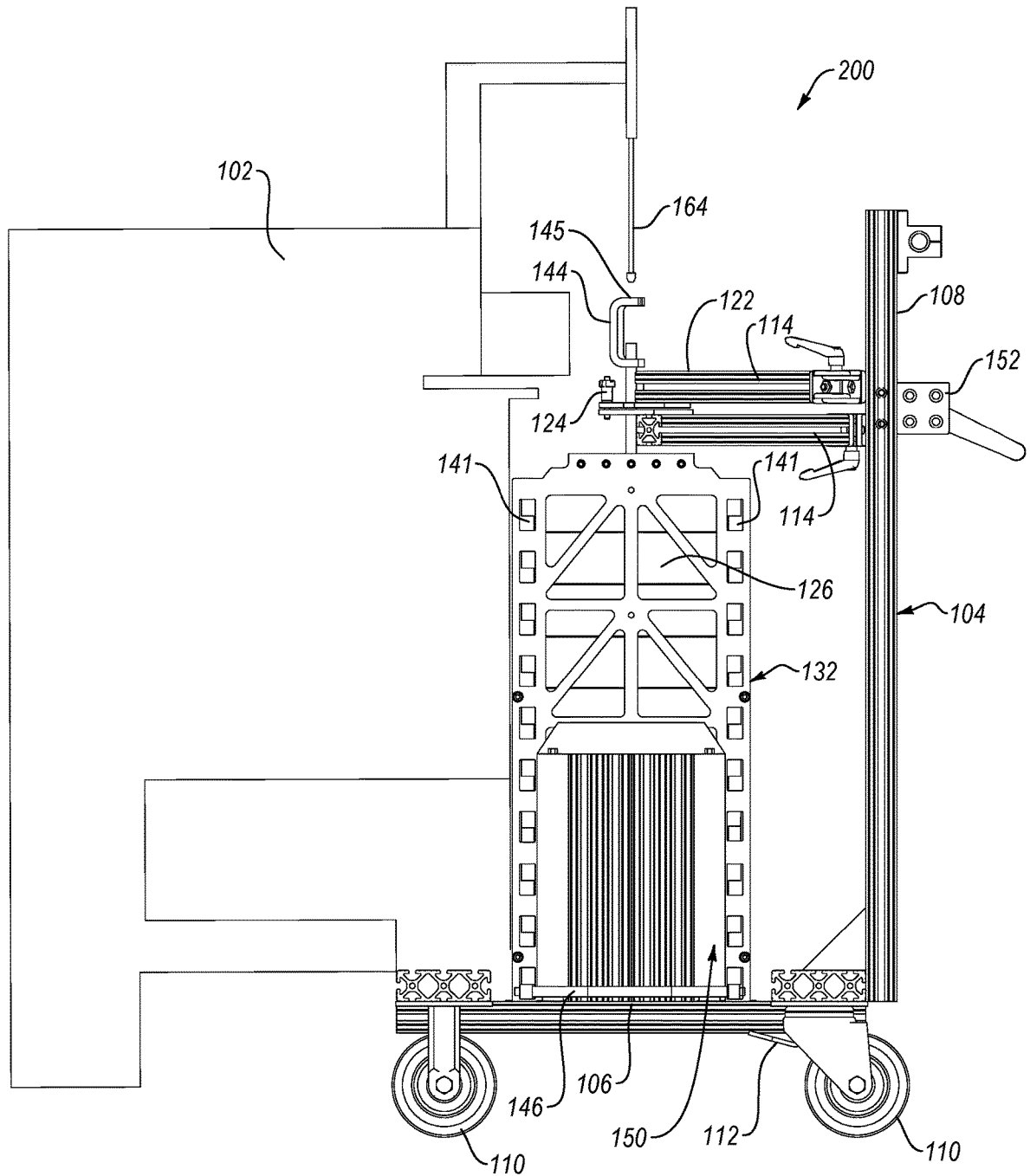
FIG. 7 is a schematic side view of a deadweight loading system, showing a deadweight loading apparatus of the deadweight loading system aligned with an attachment member of a testing device and a plurality of restraint arms of the deadweight loading apparatus engaged with a basket of the deadweight loading apparatus, according to one or more examples of the present disclosure.
Figure 8:
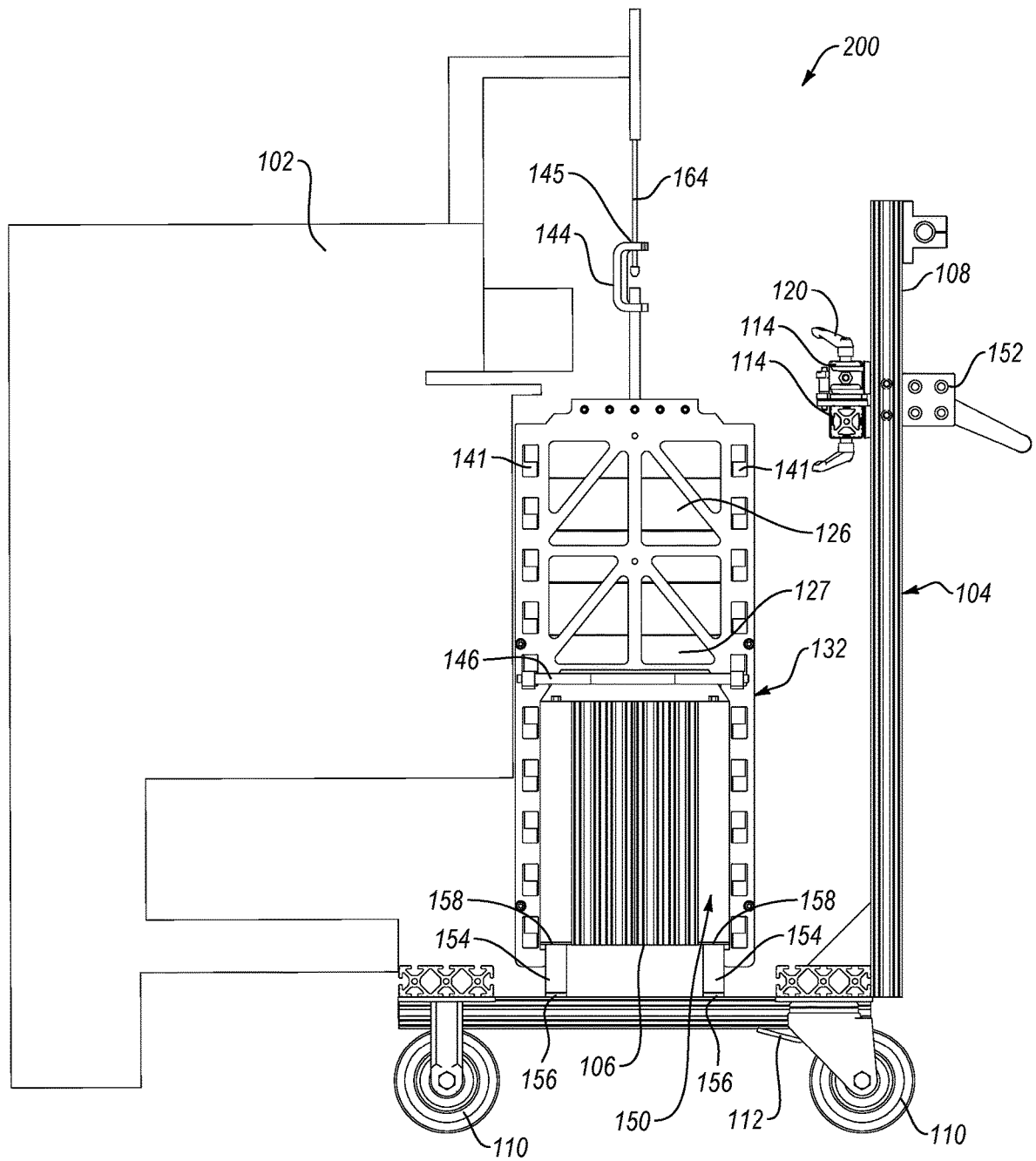
FIG. 8 is a schematic side view of the deadweight loading system of FIG. 7, showing the deadweight loading apparatus aligned with the attachment member of the testing device and secured to an adapter of the basket and the horizontal support surface raised by a lifting system, according to one or more examples of the present disclosure.
Figure 9:
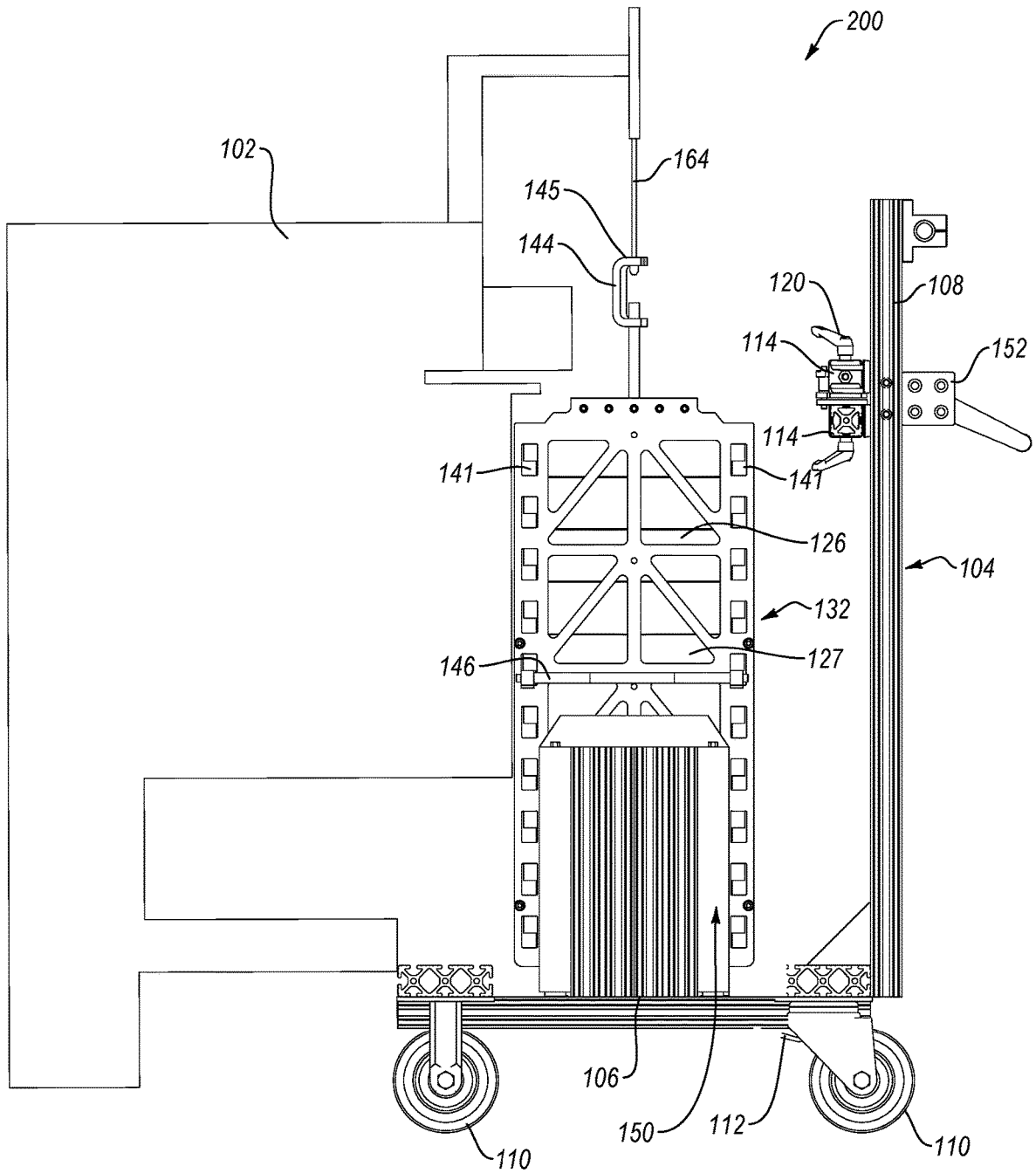
FIG. 9 is a schematic side view of the deadweight loading system of FIG. 7, showing the attachment member of the testing device secured to the adapter of the basket of the deadweight loading apparatus and suspending less than all weights of the plurality of weights, according to one or more examples of the present disclosure.

Referring to FIG. 7-9, a deadweight loading system 200 for calibrating a testing device 102 is shown. The deadweight loading system 200 includes a deadweight loading apparatus, such as the deadweight loading apparatus 100 presented above adjacent to the testing device 102. The deadweight loading apparatus 100 is moved into a calibration location (i.e. the deadweight loading apparatus 100 is in a position to be used in a calibration process) adjacent to the testing device 102 by a plurality of wheels 110. The user engagement portion 108 can assist an operator when moving the deadweight loading apparatus 100. The wheel lock 112 on at least one of the wheels 110 may be locked to lock the deadweight loading apparatus 100 after it has been moved to the calibration location, therefore preventing the deadweight loading apparatus 100 from moving from the calibration location during the calibration process. When in the calibration location, the slot 145 of the adapter 144 of the basket 132 is aligned directly below an attachment member 164 of the testing device 102. Before the lifting system 150 is engaged, the selector bar 146 is not supporting any mass and may be engaged with the basket 132 at any one of the selector-bar engagement openings 141 in the basket 132. Alternatively, the selector bar 146 can be stored elsewhere on the cart, before the calibration process or during storage.

The plurality of restraint arms 114 are in the restraint position 122 in which the plurality of restraint arms 114 are engaged with the basket 132. As shown, the plurality of restraint arms 114 are engaged with the adapter 144 of the basket 132 and a pin 124 is engaged with the plurality of restraint arms 114 to retain the plurality of restraint arms 114 in the restraint position 122.

As shown in FIG. 8, the plurality of restraint arms 114 are in a stored position 120. In the stored position 120, the plurality of restraint arm 114 have been disengaged from the basket 132 and folded towards the user engagement portion 108 of the cart 104. Accordingly, the plurality of restraint arms 114 are disengaged from the basket 132 and the plurality of restraint arms 114 are no longer interfering with the lifting of the basket 132.

The selector bar 146 is selectively and adjustably engaged with the basket 132 with the two extension arms 148 of the selector bar 146 fitted within a corresponding one of two grooves 128 of a selected weight 127. The selected weight 127 of the plurality of weights 126 and any weights of the plurality of weights 126 stacked on the selected weight 127 has a mass. The mass of the weights above the selector bar 146 (i.e. the selected weight 127 and any of the weights stacked on the selected weight 127) is equal to the desired mass to be loaded on the testing device 102. In one example, the selector bar 146 is engaged with the selected weight 127 before at least one actuator of the lifting system 150 is actuated. In other words, the selector bar 146 is engaged with the selected weight 127 before the horizontal support surface 106 is raised or lowered. In other examples, the selector bar 146 is engaged with the selected weight 127 after the actuator of the lifting system 150 is actuated, but before the basket 132 is suspended from the attachment member 164.

The plurality of actuators 154 of a lifting system 150 have been actuated to raise the horizontal support surface 106, as shown. Accordingly, the second end portion 158 of the actuators 154 raises the horizontal support surface 106, relative to the first end portion 156. Additionally, the plurality of weights 126 stacked on the horizontal support surface 106 and the basket 132 supported by the horizontal support surface 106 are raised as the horizontal support surface 106 is raised. The horizontal support surface 106 is raised to a height in which the adapter 144 of the basket 132 is extended beyond a base of the attachment member 164 of the testing device 102. The attachment member 164 is configured to be removably attached within the slot 145 of the adapter 144 and securely support up to the total mass of the plurality of weights 126 and the basket 132. In some cases, the attachment member 164 is a flexible cable that can be slid within the slot 145 of the adapter 144. The base of the attachment member 164, which may include a ball end, extends below the slot 145. Once the adapter 144 is lifted beyond the base of the attachment member 164, the attachment member 164 is slid within the slot 145, as shown in FIG. 8.

As shown in FIG. 9, the actuators 154 are actuated to lower the horizontal support surface 106. The horizontal support surface 106 is lowered until the basket 132 and the selected weight 127 and any weights of the plurality of weights 126 stacked on the selected weight 127 are suspended, via the adapter 144, by the attachment member 164 of the testing device 102. In other words, the horizontal support surface 106 is lowered until the mass of the selected weight 127 of the plurality of weights 126 and the mass of any weights of the plurality of weights 126 stacked on the selected weight 127 and the basket 132 is applied to the attachment member 164 of the testing device 102. The remaining weights of the plurality of weights 126 which were not stacked on the selected weight 127 remain stacked on the horizontal support surface 106. Therefore, the mass of the remaining weights of the plurality of weights 126 not stacked on the selected weight 127 do not contribute to the mass suspended by the attachment member 164.

Figure 10:
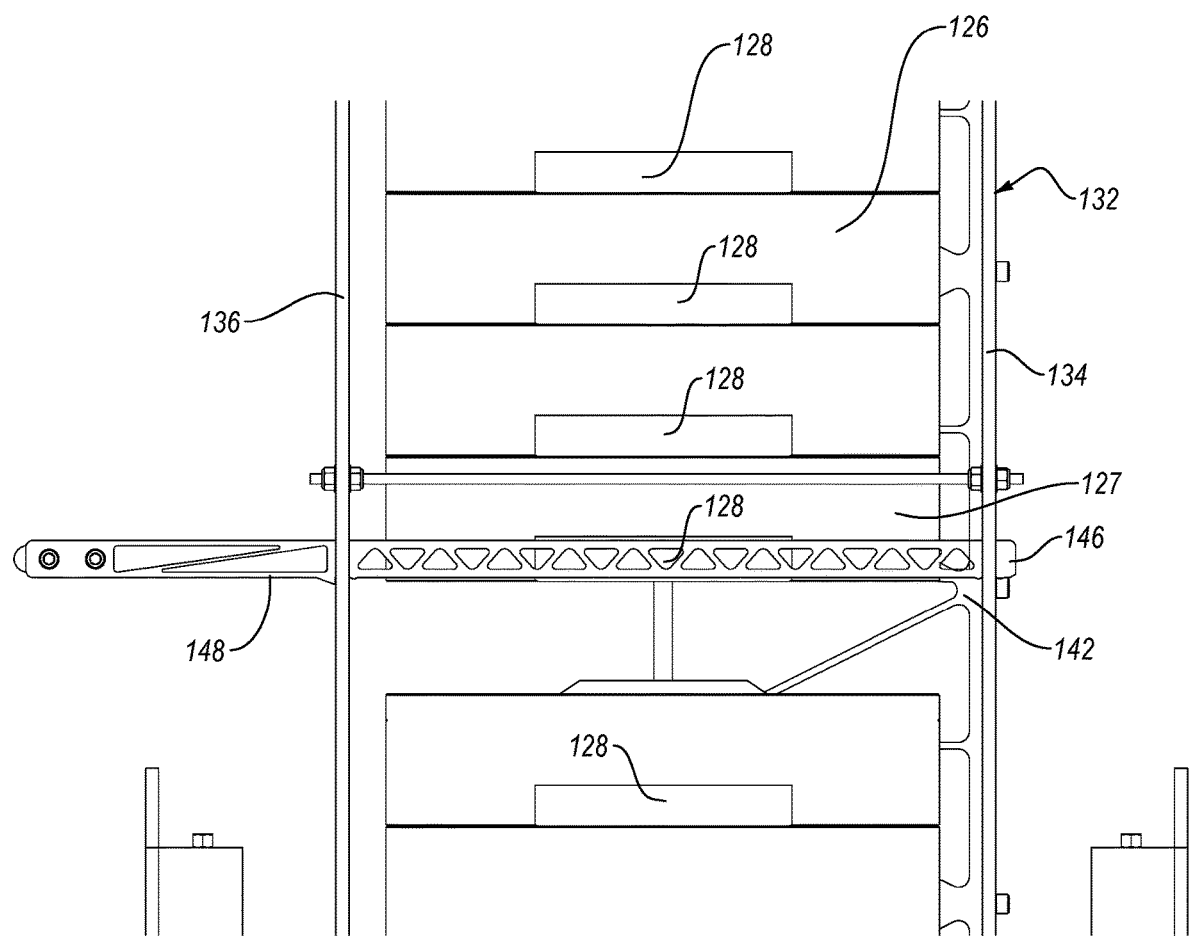
FIG. 10 is a schematic side view of a deadweight loading apparatus, showing a selector bar selectively adjustably engaged with a first side plate and a second side plate of the basket and fitted within a groove of a corresponding one weight of a plurality of weights, according to one or more examples of the present disclosure.

Referring to FIG. 10, a side view of the deadweight loading apparatus 100 with the selector bar 146 engaged with the first side plate 134 and the second side plate 136 of the basket 132 and fitted within a groove 128 of a corresponding one weight 127 of the plurality of weights 126, is shown. One extension arm 148 of the selector bar 146 is engaged with one selector-bar engagement opening 141 in the first side plate 134, a groove 128 of the corresponding one weight 127, and one selector-bar engagement opening 141 in the second side plate 136. Although not visible in FIG. 10, the other extension arm 148 of the selector bar 146 is engaged with one selector-bar engagement opening 141 in the first side plate 134, a groove 128 on the opposite side of the shown groove in the corresponding one weight 127, and one selector-bar engagement opening 141 in the second side plate 136.

A center panel 142 extends perpendicularly from the first side plate 134 and terminates at a location intermediate the first side plate 134 and the second side plate 136. The center panel 142 is fitted within a through-slot (not shown) in each weight of the plurality of weights 126. The center panel 142 does not attach to the through-slot or interfere with the raising or lowering of the basket 132. When the basket is raised or lowered, the center panel 142 prevents the basket 132 from twisting or otherwise moving out of alignment with the plurality of weights 126.

Figure 11:
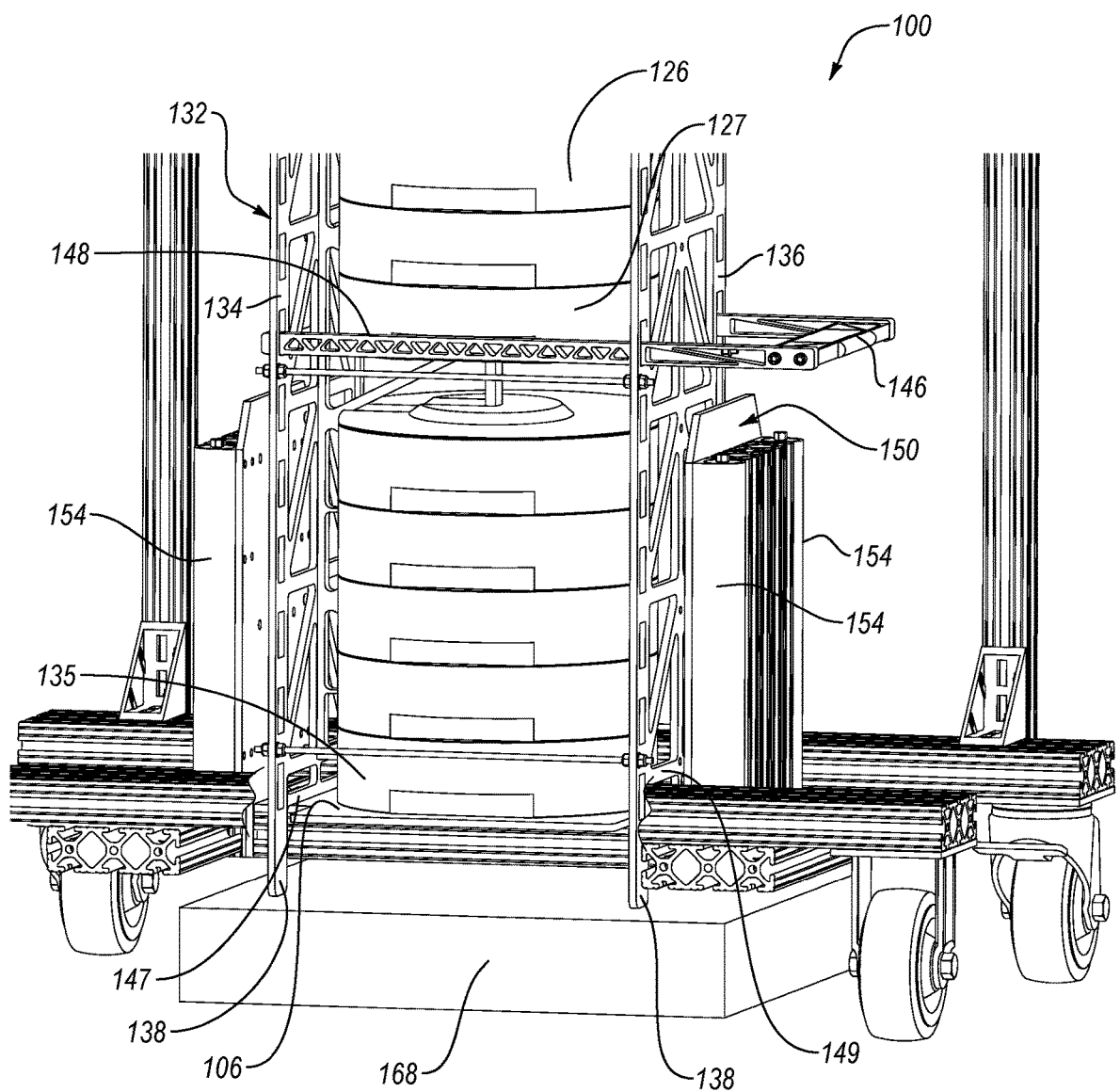
FIG. 11 is a schematic perspective view of a deadweight loading system, showing a deadweight loading apparatus of the deadweight loading system aligned with a scale of a testing device and a basket lowered onto the scale by a lifting device lowering a horizontal support surface, according to one or more examples of the present disclosure.

As shown in FIG. 11, according to some examples, the deadweight loading apparatus 100 is used to calibrate a testing device 102 below the deadweight loading apparatus 100. The deadweight loading apparatus 100 is moved into position over a scale 168 of the testing device 102. The basket 132 is aligned over the scale 168, such that when lowered, the basket 132 is fully supported on the scale 168. The extension arms 148 of the selector bar 146 are engaged with a selected weight 127, corresponding with the desired mass for calibrating the testing device 102. The selected weight 127 and any weights of the plurality of weight 126 stacked on the selected weight 127 equals the desired mass for calibrating the testing device 102.

Before engaging the lifting system 150, the plurality of weights 126 and the basket 132 are supported on a horizontal support surface 106 of a cart 104. The horizontal support surface 106 is lowered, by a lifting system 150, until a plurality of legs 138 that extend from a bottom end 147 of the first side plate 134 and a bottom end 149 of a second side plate 136 are supported by the scale 168. The horizontal support surface 106 is further lowered until any weights of the plurality of weights 126, below the selected weight 127, are supported only by the horizontal support surface 106. The scale 168 of the testing device 102 is loaded with the desired mass for calibration which includes the mass of the selected weight 127 and any weight of the plurality of weights 126 stacked on the selected weight 127.

Figure 12:
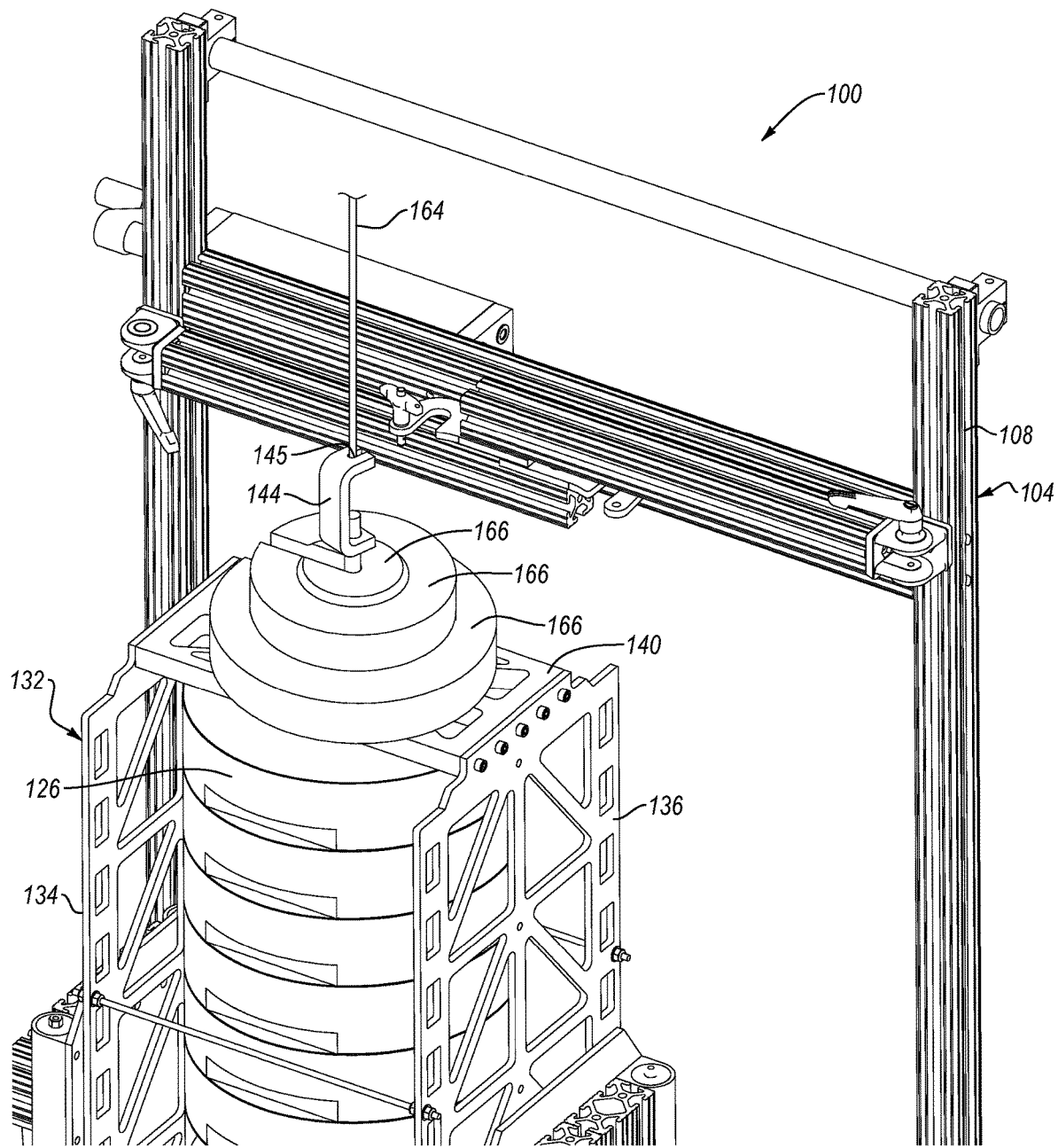
FIG. 12 is a schematic perspective view of a deadweight loading system, showing an attachment member of a testing device secured to an adapter of a basket and a plurality of refining weights stacked on top of the basket, according to one or more examples of the present disclosure.

Referring to FIG. 12, refining weights 166 can be added to the deadweight loading apparatus 100. The refining weights 166 are configured to be added to the deadweight loading apparatus 100 to add additional mass to the calibration process, and can either be added before or during a calibration process. The refining weights 166 have a through-slot that extends from an outer periphery of the refining weight 166, on one side of the refining weight 166, to a location intermediate the one side of the refining weight 166 and another side of the refining weight 166. The refining weights 166 are configured to be added above the top plate 140 of the basket 132 by sliding at least one refining weight 166 onto the adapter by the through-slot. The refining weights 166 can be a variety of masses and multiple refining weights 166 can be added to deadweight loading apparatus 100.

Figure 13:
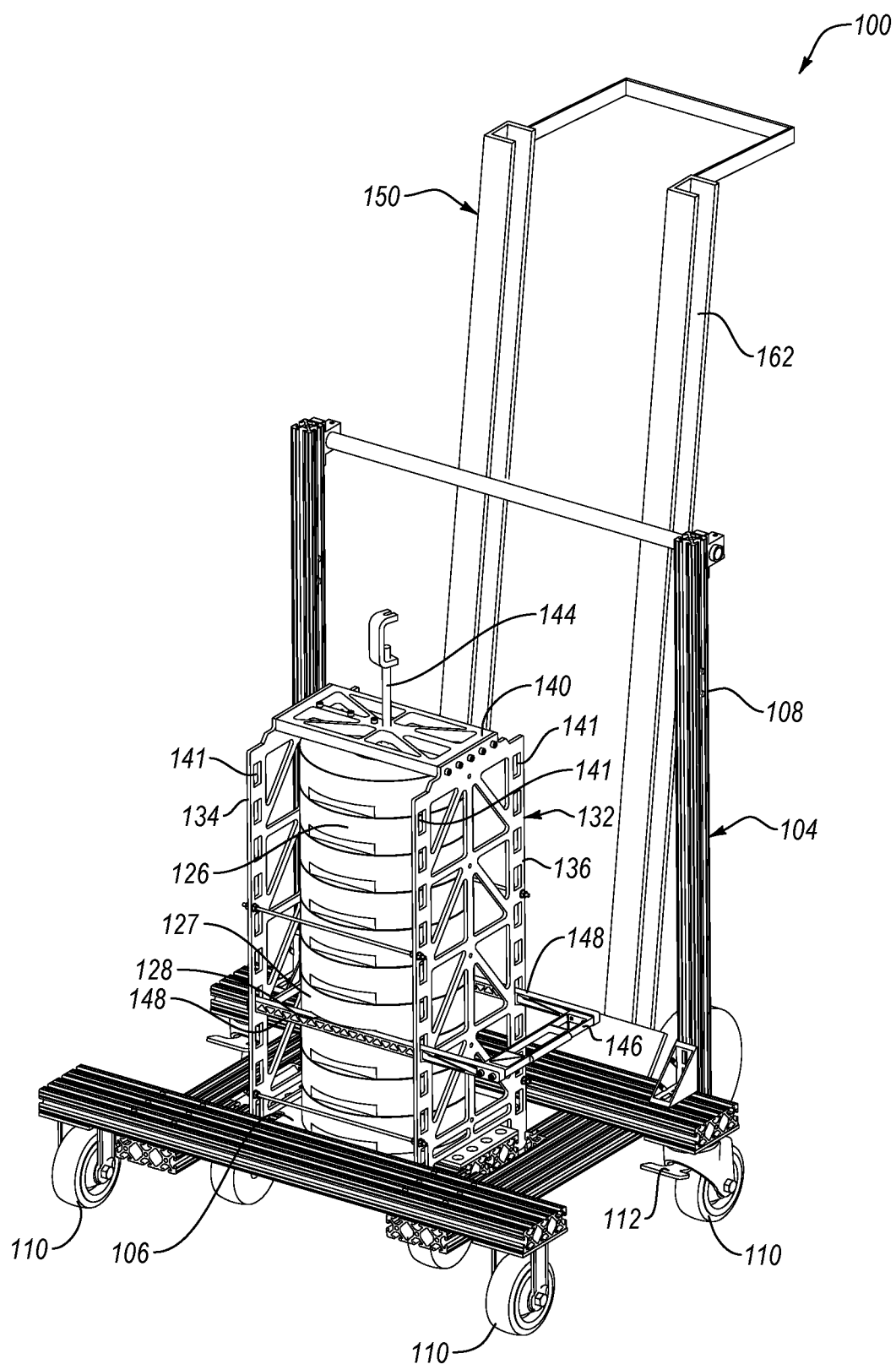
FIG. 13 a schematic perspective view of a deadweight loading apparatus for calibrating a testing device, where the deadweight loading apparatus has a plurality of weights stacked on a horizontal support surface and a basket supported by a horizontal support surface, and a lift cart is movable into a position under the horizontal support surface, according to one or more examples of the present disclosure.

Referring to FIG. 13, and according to some examples, a deadweight loading apparatus 100 is shown. A cart 104 includes a plurality of weights 126 stacked on the horizontal support surface 106 and a basket 132 supported on the horizontal support surface 106. A lifting system 150 is separable from the deadweight loading apparatus 100 and configured to be moved under the horizontal support surface 106, when the deadweight loading apparatus 100 is in a calibration location. Once the selector bar 146 is engaged with the first side plate 134, the two grooves 128 of the selected weight 127, and the second side plate 136, the lifting system 150 can be used to raise the horizontal support surface 106. The lifting system 150 includes a lift cart 162 that is operational to alternatively raise and lower the horizontal support surface 106, relative to the cart 104, from beneath the horizontal support surface 106. The lift cart 162 has a lifting platform that is configured to fit underneath the horizontal support surface 106 and raise or lower the horizontal support surface 106. The lifting cart 162 includes an operator-operated lift system, such as a foot-operated hydraulic lift that is coupled with the lifting platform and operational, by an operator, to raise and lower the lifting platform. In one example, the lift cart 162 raises and lowers the horizontal support surface 106 vertically. In another example, the lift cart 162 raises and lowers the horizontal support surface 106 at an angle from the vertical.

Figure 14:
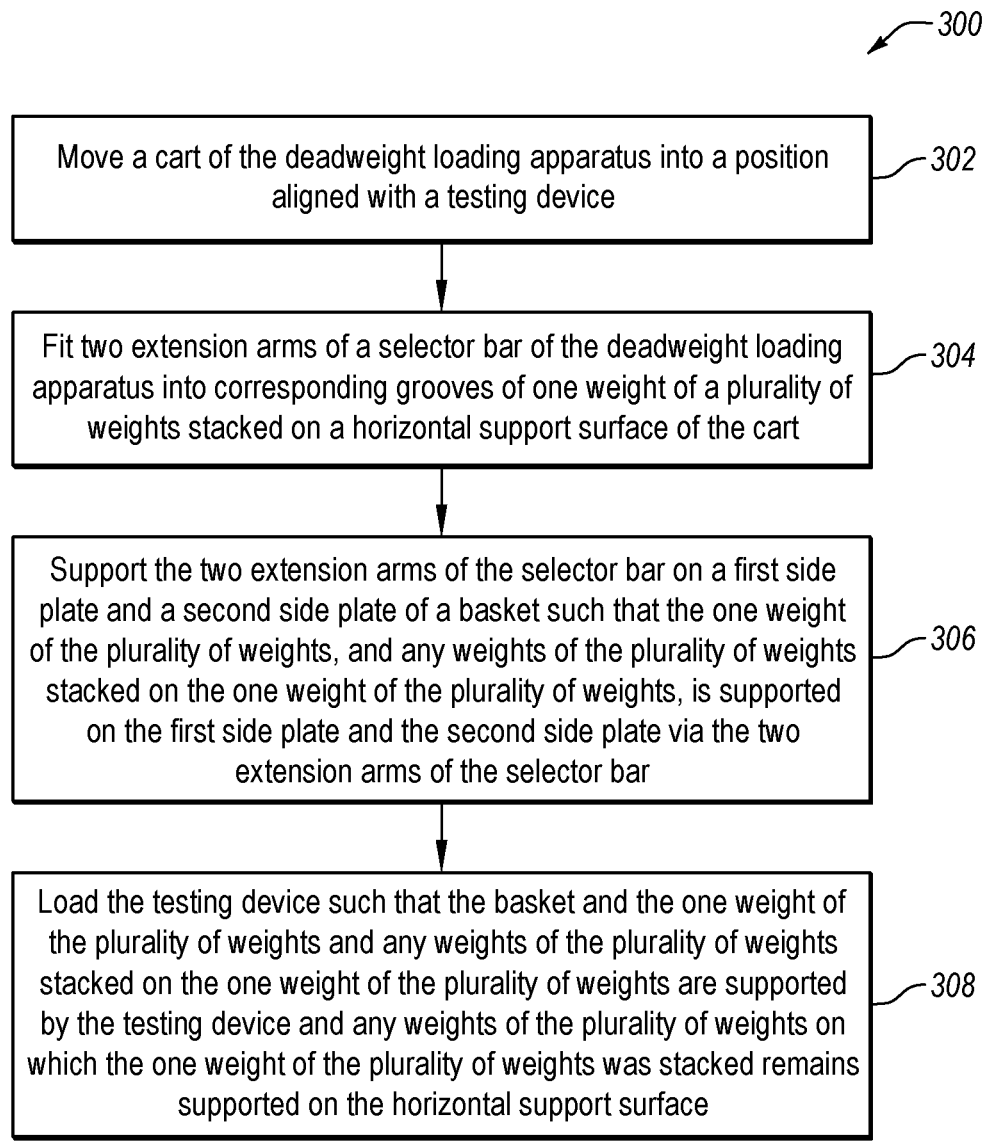
FIG. 14 is a schematic flow diagram of a method of calibrating a testing device using a deadweight loading apparatus, according to one or more examples of the present disclosure.

Now referring to FIG. 14, according to certain examples, a method 300 for calibrating a testing device 102 using a deadweight loading apparatus 100 is shown. The method 300 is performed using any one or more of the examples of the apparatus 100 or the system 200 disclosed herein. The method 300 includes (block 302) moving a cart 104 of the deadweight loading apparatus 100 into a position aligned with a testing device 102. The method 300 also includes (block 304) fitting two extension arms 148 of a selector bar 146 of the deadweight loading apparatus 100 into corresponding grooves 128 of one weight 127 of a plurality of weights 126 stacked on a horizontal support surface 106 of the cart 104 between a first side plate 134 and a second side plate 136 of a basket 132 of the deadweight loading apparatus 100. The method 300 also includes (block 306) supporting the two extension arms 148 of the selector bar 146 on the first side plate 134 and the second side plate 136 such that the one weight 127 of the plurality of weights 126, and any weights 126 of the plurality of weights 126 stacked on the one weight 127 of the plurality of weights 126, is supported on the first side plate 134 and the second side plate 136 via the two extension arms 148 of the selector bar 146. The method 300 further includes (block 308) loading the testing device 102, wherein the basket 132 and the one weight 127 of the plurality of weights 126, and any weights 126 of the plurality of weights 126 stacked on the one weight 127 of the plurality of weights 126, are supported by the testing device 102 and any weights 126 of the plurality of weights 126 on which the one weight 127 of the plurality of weights 126 was stacked remains supported on the horizontal support surface 106.

In some examples, the step of moving the cart 104 of the deadweight loading apparatus 100 into the position aligned with the testing device 102 includes moving the cart 104 under an attachment member 164 of the testing device 102. Loading the testing device 102 includes lifting the horizontal support surface 106 relative to the cart 104 such that the horizontal support surface 106 raises the plurality of weights 126 and the basket 132. Loading the testing device 102 also includes securing the attachment member 164 of the testing device 102 to the basket 132. Additionally, loading the testing device 102 includes lowering the horizontal support surface 106, relative to the cart 104, such that the one weight 127 of the plurality of weights 126 and any weights of the plurality of weights 126 stacked on the one weight 127 is suspended by the attachment member 164 of the testing device 102. Any weights of the plurality of weights 126 on which the one weight 127 was stacked remains supported on the horizontal support surface 106.

In other examples, the step of moving the cart 104 of the deadweight loading apparatus 100 into the position aligned with the testing device includes moving the cart 104 over a scale 168 of the testing device 102. Loading the testing device 102 includes lowering the horizontal support surface 106 relative to the cart 104, such that the horizontal support surface 106 lowers the basket 132 and plurality of weights 126 until the basket 132 and the one weight 127 of the plurality of weights 126, and any weights of the plurality of weights 126 stacked on the one weight 127 is supported only on the scale 168 of the testing device 102. As in the example above, any weights of the plurality of weights on which the one weight 127 was stacked remains supported on the horizontal support surface 106.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A deadweight loading apparatus for calibrating a testing device, the deadweight loading apparatus comprising:
   a cart comprising a horizontal support surface and a user engagement portion;
   a plurality of weights stackable on the horizontal support surface, each weight of the plurality of weights comprising two grooves each located on a corresponding one of opposite sides of the weight;
   a basket supportable on the horizontal support surface, the basket comprising a first side plate and a second side plate that is spaced apart from the first side plate such that the plurality of weights is positioned between the first side plate and the second side plate when the plurality of weights is stacked on the horizontal support surface and when the basket is supported on the horizontal support surface; and
   a selector bar comprising two extension arms that are selectively adjustably engageable with the first side plate and the second side plate at each one of multiple vertical locations along the first side plate and the second side plate, wherein when selectively adjustably engaged with the first side plate and the second side plate at any one of the multiple vertical locations each one of the two extension arms is fitted within a corresponding one of the two grooves of a corresponding one of the plurality of weights.

2. The deadweight loading apparatus of claim 1, further comprising a plurality of restraint arms coupled with the cart, wherein each restraint arm of the plurality of restraint arms:
   comprises a first end, pivotably attached to the user engagement portion above the first side plate and the second side plate, and a second end spaced apart from the first end; and
   is movable between a stored position, disengaged with the basket, and a restraint position, engaged with the basket.

3. The deadweight loading apparatus of claim 2, further comprising a pin configured to engage with the plurality of restraint arms, when in the restraint position, such that the plurality of restraint arms is retained in the restraint position.

4. The deadweight loading apparatus of claim 1, wherein the first side plate and the second side plate of the basket are connected by a top plate such that the plurality of weights is positioned below the top plate when the plurality of weights is stacked on the horizontal support surface and when the basket is supported on the horizontal support surface.

5. The deadweight loading apparatus of claim 1, further comprising an adapter removably attached to the basket, wherein the adapter comprises a slot configured to removably secure an attachment member of the testing device.

6. The deadweight loading apparatus of claim 1, further comprising a plurality of legs extending from each one of a bottom end of the first side plate and a bottom end of the second side plate, wherein the plurality of legs are spaced apart from each other by at least a width of the horizontal support surface such that the plurality of legs extend downwardly beyond the horizontal support surface when the basket is supported on the horizontal support surface.

7. The deadweight loading apparatus of claim 6, wherein the horizontal support surface is movable relative to the cart to lower or raise the plurality of legs relative to the cart.

8. The deadweight loading apparatus of claim 1, wherein:
   each weight of the plurality of weights comprises a through-slot extending from an outer periphery of the weight, on one side of the weight, to a location intermediate the one side of the weight and another side of the weight, opposite the one side of the weight;
   the basket comprises a center panel extending perpendicularly from the first side plate toward the second side plate and terminating at a location intermediate the first side plate and the second side plate; and
   when the plurality of weights is stacked on the horizontal support surface and when the basket is supported on the horizontal support surface the center panel fits within the through-slot of each weight of the plurality of weights.

9. The deadweight loading apparatus of claim 1, further comprising a lifting system coupled with the cart and the horizontal support surface, wherein the lifting system is operational to alternatively raise and lower the horizontal support surface relative to the cart.

10. The deadweight loading apparatus of claim 9, wherein:
the lifting system comprises a user control device and at least one actuator;
the user control device is fixed to the cart;
the user control device is operationally coupled with the at least one actuator and operational to actuate the at least one actuator;
the at least one actuator comprises a first end portion fixed to the cart and a second end portion fixed to the horizontal support surface; and
actuation of the at least one actuator comprises movement of the second end portion relative to the first end portion.

11. The deadweight loading apparatus of claim 10, wherein the user control device comprises one of a manually-operable hand crank or an automated controller.

12. The deadweight loading apparatus of claim 1, further comprising a lifting system that is separable from and engageable with the horizontal support surface, wherein the lifting system comprises a lift cart that is movable into a position under the horizontal support surface and operational to alternatively raise and lower the horizontal support surface relative to the cart.

13. A deadweight loading system for calibrating a testing device, the deadweight loading system comprising:
a cart comprising a horizontal support surface and a user engagement portion;
a plurality of weights stackable on the horizontal support surface, each weight of the plurality of weights comprising two grooves each located on a corresponding one of opposite sides of the weight;
a basket supportable on the horizontal support surface, the basket comprising a first side plate and a second side plate, connected by a top plate, the first side plate spaced apart from the second side plate such that the plurality of weights is positioned between the first side plate and the second side plate and below the top plate when the plurality of weights is stacked on the horizontal support surface and when the basket is supported on the horizontal support surface;
a selector bar comprising two extension arms that are selectively adjustably engageable with the first side plate and the second side plate at each one of multiple vertical locations along the first side plate and the second side plate, wherein when selectively adjustably engaged with the first side plate and the second side plate at any one of the multiple vertical locations each one of the two extension arms is fitted within a corresponding one of the two grooves of a corresponding one of the plurality of weights;
a lifting system coupled with the cart and the horizontal support surface, wherein the lifting system is operational to alternatively raise and lower the horizontal support surface relative to the cart; and
an adapter removably attached to the top plate of the basket, the adapter comprising a slot configured to removably secure an attachment member of the testing device when the lifting system is operated to raise the horizontal support surface relative to the cart and the attachment member is secured within the slot of the adapter.

14. The deadweight loading system of claim 13, wherein:
the lifting system comprises a user control device and at least one actuator;
the user control device is fixed to the cart;
the user control device is operationally coupled with the at least one actuator and operational to actuate the at least one actuator;
the at least one actuator comprises a first end portion fixed to the cart and a second end portion fixed to the horizontal support surface; and
actuation of the at least one actuator comprises movement of the second end portion relative to the first end portion.

15. A method of calibrating a testing device using a deadweight loading apparatus, the method comprising steps of:
moving a cart of the deadweight loading apparatus into a position aligned with a testing device;
fitting two extension arms of a selector bar of the deadweight loading apparatus into corresponding grooves of one weight of a plurality of weights stacked on a horizontal support surface of the cart between a first side plate and a second side plate of a basket of the deadweight loading apparatus;
supporting the two extension arms of the selector bar on the first side plate and the second side plate such that the one weight of the plurality of weights, and any weights of the plurality of weights stacked on the one weight of the plurality of weights, is supported on the first side plate and the second side plate via the two extension arms of the selector bar; and
loading the testing device such that the basket and the one weight of the plurality of weights, and any weights of the plurality of weights stacked on the one weight of the plurality of weights, are supported by the testing device and such that any weights of the plurality of weights, on which the one weight of the plurality of weights was stacked, remains supported on the horizontal support surface.

16. The method of claim 15, wherein:
the step of moving a cart of the deadweight loading apparatus into the position aligned with the testing device comprises moving the cart into a position under an attachment member of the testing device; and
the step of loading the testing device comprises:
lifting the horizontal support surface relative to the cart such that the horizontal support surface raises the plurality of weights and the basket;
securing the attachment member of the testing device to the basket; and
lowering the horizontal support surface relative to the cart such that the one weight of the plurality of weights, and any weights of the plurality of weights stacked on the one weight, is suspended by the attachment member of the testing device and any weights of the plurality of weights on which the one weight was stacked remains supported on the horizontal support surface.

17. The method of claim 15, wherein:
the step of moving the cart of the deadweight loading apparatus into the position aligned with the testing device comprises moving the cart over a scale of the testing device; and
the step of loading the testing device comprises lowering the horizontal support surface relative to the cart such that the horizontal support surface lowers the basket and plurality of weights until the basket and the one weight of the plurality of weights, and any weights of the plurality of weights stacked on the one weight, is supported only on the scale of the testing device and any weights of the plurality of weights on which the one weight was stacked remains supported on the horizontal support surface.

18. The method of claim 15, further comprising selecting a desired mass to be loaded on the testing device, wherein a mass of the one weight of the plurality of weights, and any weights of the plurality of weights stacked on the one weight is equal to the desired mass.

19. The method of claim 15, wherein the step of loading the testing device comprises engaging a lifting system coupled with the cart and the horizontal support surface, wherein the lifting system is operational to alternatively raise and lower the horizontal support surface relative to the cart.

20. The method of claim 19 wherein:
the lifting system comprises a user control device and at least one actuator coupled to the user control device, the at least one actuator comprises a first end portion fixed to the cart and a second end portion fixed to the horizontal support surface; and
actuating the at least one actuator moves the second end portion relative to the first end portion.

\* \* \* \* \*